(12) United States Patent
Shin et al.

(10) Patent No.: US 12,512,475 B2
(45) Date of Patent: Dec. 30, 2025

(54) COMPOSITIONS AND METHODS FOR DRY ELECTRODE FILMS INCLUDING ELASTIC POLYMER BINDERS

(71) Applicant: Tesla, Inc., Austin, TX (US)

(72) Inventors: Joon Ho Shin, San Diego, CA (US); Hieu Minh Duong, Rosemead, CA (US)

(73) Assignee: Tesla, Inc., Austin, TX (US)

( * ) Notice: Subject to any disclaimer, the term of this patent is extended or adjusted under 35 U.S.C. 154(b) by 46 days.

(21) Appl. No.: 16/831,352

(22) Filed: Mar. 26, 2020

(65) Prior Publication Data

US 2020/0313193 A1    Oct. 1, 2020

Related U.S. Application Data

(60) Provisional application No. 62/826,273, filed on Mar. 29, 2019.

(51) Int. Cl.
| | |
|---|---|
| *H01M 4/62* | (2006.01) |
| *H01M 4/137* | (2010.01) |
| *H01M 4/139* | (2010.01) |
| *H01M 4/60* | (2006.01) |

(52) U.S. Cl.
CPC ........... *H01M 4/622* (2013.01); *H01M 4/137* (2013.01); *H01M 4/139* (2013.01); *H01M 4/602* (2013.01)

(58) Field of Classification Search
CPC .......................... H01M 4/0435; H01M 4/622
See application file for complete search history.

(56) References Cited

U.S. PATENT DOCUMENTS

| | | | | |
|---|---|---|---|---|
| 2005/0064290 A1* | 3/2005 | Panzer | ............... | H01M 4/525 |
| | | | | 429/218.1 |
| 2011/0262803 A1 | 10/2011 | Huang et al. | | |
| 2014/0030590 A1* | 1/2014 | Wang | ............... | H01M 4/366 |
| | | | | 977/734 |
| 2015/0303481 A1* | 10/2015 | Duong | ............... | H01G 9/15 |
| | | | | 429/217 |

(Continued)

FOREIGN PATENT DOCUMENTS

| | | |
|---|---|---|
| JP | 2000-173618 | 6/2000 |
| JP | 2000-182436 | 6/2000 |

(Continued)

OTHER PUBLICATIONS

Ludwig et al., Nov. 2017, Understanding interfacial-energy-driven dry powder mixing for solvent-free additive manufacturing of Li-Ion battery electrodes, Advanced Materials Interfaces, 4(21):1700570, 10 pp.

(Continued)

*Primary Examiner* — Stephan J Essex

(74) *Attorney, Agent, or Firm* — Knobbe, Martens, Olson & Bear, LLP

(57) ABSTRACT

Provided herein are dry process electrode films, and energy storage devices incorporating the same, including an elastic polymer binder. In some embodiments, the dry process electrode films are PTFE-free or comprise an insubstantial amount of PTFE. The electrode films exhibit improved mechanical and processing characteristics. Also provided are methods for processing such elastic polymer binders, and for incorporating the elastic polymer binders in electrode films.

18 Claims, 21 Drawing Sheets

(56) References Cited

U.S. PATENT DOCUMENTS

2018/0175366 A1* 6/2018 Zheng ................. H01M 4/1391
2020/0220151 A1* 7/2020 Reinsch ................. H01M 4/04

FOREIGN PATENT DOCUMENTS

| JP | 2004-071517 | 3/2004 |
| JP | 2006-332626 | 12/2006 |
| JP | 2017-517862 | 6/2017 |
| JP | 2021-504887 | 2/2021 |
| WO | WO 16/084864 | 6/2016 |
| WO | WO 19/025337 | 2/2019 |
| WO | WO 19/222110 | 11/2019 |

OTHER PUBLICATIONS

Qiang et al., 2019, Dry process for fabricating low cost and high performance electrode for energy storage devices, MRS Advances, 4(15):857-863.
International Search Report and Written Opinion dated Jun. 30, 2020 in PCT/US2020/025028.
Wood et al., Aug. 29, 2017, Technical and economic analysis of solvent-based lithium-ion electrode drying with water and NMP, Drying Technology, 36(2):1-11.

\* cited by examiner

COMPOSITIONS AND METHODS FOR DRY ELECTRODE FILMS INCLUDING ELASTIC POLYMER BINDERS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Prov. App. No. 62/826,273, filed Mar. 29, 2019, which is incorporated by reference herein in its entirety for all purposes.

BACKGROUND

Field

The present disclosure relates generally to dry energy storage device electrodes, energy storage devices implementing such an electrode, and related methods.

Description of the Related Art

Conventional energy storage devices and related methods generally include binder materials that are combined with active electrode materials and other additives, and processed in a way that forms an electrode film. The electrode film is generally applied to one or more other layers of material to form an electrode. Generally, a negative electrode (anode) and positive electrode (cathode) are formed, with a separator positioned therebetween, and inserted into a housing with electrolyte to form various types of energy storage devices.

The electrode films used within energy storage device electrodes may be formed using wet or dry processes. For example, active electrode materials may be combined with binder materials, solvents, and other additives, in a wet coating method which requires substantial subsequent drying techniques to fabricate an electrode film.

Dry electrode processes have been developed to reduce the time-consuming and costly drying procedures required by the aforementioned wet processes. For example, electrode processes can include combining a polytetrafluoroethylene (PTFE) binder with active electrode material, and calendering to form an electrode film. However, an energy storage device including an electrode comprising a PTFE binder may exhibit undesired device performance, such as increased irreversible capacity loss during redox processes.

SUMMARY

For purposes of summarizing the invention and the advantages achieved over the prior art, certain objects and advantages of the invention are described herein. Not all such objects or advantages may be achieved in any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In a first aspect, a dry electrode film of an energy storage device is provided. The dry electrode film includes a dry active material and a dry binder comprising an elastic polymer, wherein the dry binder is PTFE-free or comprises an insubstantial amount of PTFE, and wherein the dry electrode film is free-standing.

In some embodiments, the elastic polymer is selected from at least one of PE, PEO and PVDF. In some embodiments, the dry electrode film comprises about 0-5 wt. % PE and about 0-2 wt. % PVDF. In some embodiments, the dry active material comprises graphite. In some embodiments, the dry electrode film comprises about 96 wt. % graphite and about 4 wt. % PE. In some embodiments, the dry electrode film comprises about 96 wt. % graphite, about 3 wt % PE and about 1 wt % PVDF.

In another aspect, a dry electrode film for use in an energy storage device is provided. The dry electrode film includes a dry active material, and a dry binder comprising an elastic polymer, wherein the dry electrode film is free-standing and comprises at most an insubstantial amount of polytetrafluoroethylene (PTFE).

In some embodiments, the elastic polymer is selected from the group consisting of a cellulose, a polyolefin, a polyether, a polyether precursor, a polysiloxane, co-polymers thereof and admixtures thereof. In some embodiments, the elastic polymer is selected from the group consisting of polyethylene (PE), polypropylene (PP), polyvinylidene fluoride (PVDF), poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, carboxymethylcellulose (CMC), co-polymers thereof and admixtures thereof. In some embodiments, the elastic polymer is selected from the group consisting of PE, PEO, PVDF and admixtures thereof. In some embodiments, the dry electrode film comprises a weight percent of elastic polymer of about 0.5-10 wt. %.

In some embodiments, the dry electrode film is PTFE-free. In some embodiments, the dry electrode film is absent of processing solvent residue. In some embodiments, the dry electrode film comprises a weight percent of dry active material of at least about 95 wt. %. In some embodiments, the dry active material is graphite. In some embodiments, the dry electrode film comprises a tensile strength of at least about 1 N. In some embodiments, the dry electrode film is nearly defect-free.

In some embodiments, an electrode comprising a current collector and the dry electrode film is provided. In some embodiments, a battery comprising the electrode is provided.

In another aspect, a dry electrode film fabrication process is provided. The process includes mixing a dry active material and a dry binder to form a dry first mixture, wherein the dry binder comprises an elastic polymer, and calandering the dry first mixture to form a dry electrode film, wherein the dry electrode film is free-standing and comprises at most an insubstantial amount of polytetrafluoroethylene (PTFE).

In some embodiments, mixing is performed by a nondestructive mixing process. In some embodiments, mixing does not comprise high shear mixing. In some embodiments, mixing is performed at a temperature of at least about room temperature.

In some embodiments, the dry active material has a first particle size distribution prior to mixing and a second particle size distribution subsequent to mixing, and wherein the first and second particle size distributions are substantially similar. In some embodiments, calendering is performed at a temperature of about 150-250° C. In some embodiments, the process further comprises calendering the dry electrode film.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 2A shows a processed final formulation powder. FIG. 2B shows a final powder between two rolls prior to calendering. FIGS. 2C-2F show a calendered free standing film of Formula 1 (FIG. 2C), Formula 4 (FIG. 2D), Formula 5 (FIG. 2E) and Formula 6 (FIG. 2F). FIGS. 2G and 2H show bendable free standing films for Formula 5 (FIG. 2G) and Formula 6 (FIG. 2H).

DETAILED DESCRIPTION

Figure 1:
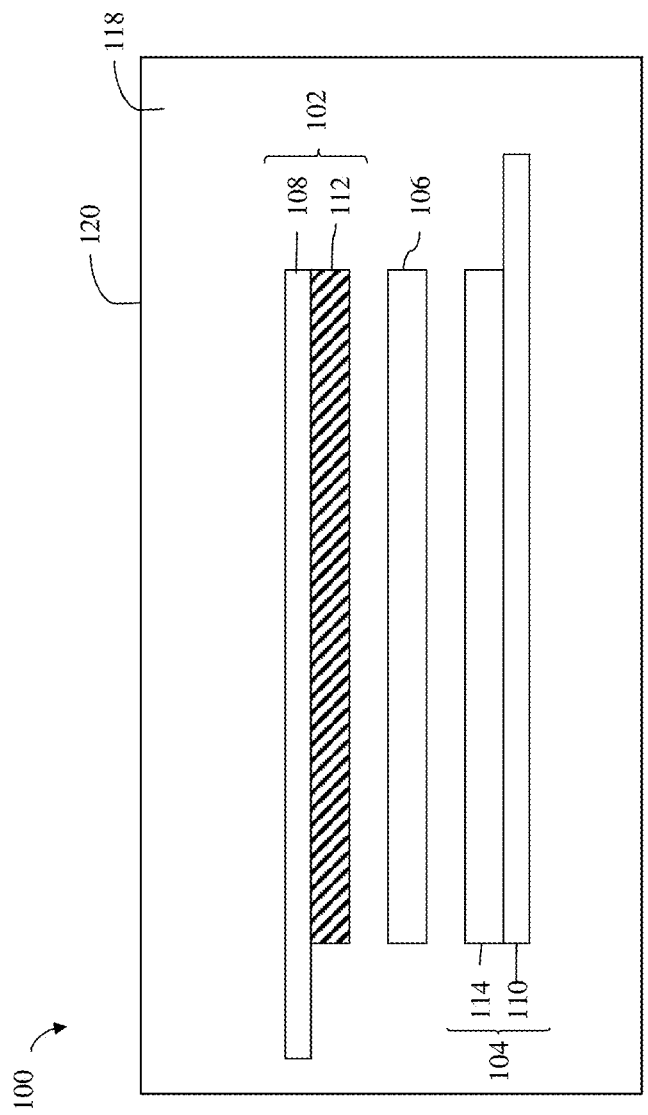
FIG. 1 depicts an embodiment of an energy storage device with an electrode film comprising an elastic polymer binder.

Disclosed are free-standing electrode films for lithium ion batteries that are made through a dry process and do not contain or contains at most an insubstantial amount of polytetrafluoroethylene (PTFE) binder. The electrode film may be made through a process that avoids the use of solvents and thus is a "dry" process. In some embodiments, the electrode film includes alternative binders, such as one or more of polyethylene (PE), polyethylene oxide (PEO) and polyvinylidene fluoride (PVDF) which were found to be useful in a dry manufacturing process, as discussed below. In one embodiment, the PTFE-free electrode films are used to make anode or cathode components of a lithium ion battery or other electronic storage device.

Definitions

The terms "battery" and "capacitor" are to be given their ordinary and customary meanings to a person of ordinary skill in the art. The terms "battery" and "capacitor" are nonexclusive of each other. A capacitor or battery can refer to a single electrochemical cell that may be operated alone, or operated as a component of a multi-cell system.

The voltage of an energy storage device is the operating voltage for a single battery or capacitor cell. Voltage may exceed the rated voltage or be below the rated voltage under load, or according to manufacturing tolerances.

A "self-supporting" electrode film is an electrode film that incorporates binder matrix structures sufficient to support the film or layer and maintain its shape such that the electrode film or layer can be free-standing. When incorporated in an energy storage device, a self-supporting electrode film or active layer is one that incorporates such binder matrix structures. Generally, and depending on the methods employed, such electrode films or active layers are strong enough to be employed in energy storage device fabrication processes without any outside supporting elements, such as a current collector or other film. For example, a "self-supporting" electrode film can have sufficient strength to be rolled, handled, and unrolled within an electrode fabrication process without other supporting elements. A dry electrode film, such as a cathode electrode film or an anode electrode film, may be self-supporting.

A "solvent-free" electrode film is an electrode film that contains no detectable, or substantially no, processing solvents, nor processing solvent residues and/or processing solvent impurities. Such a "solvent-free" electrode film is distinguished from conventional electrode films based upon conventional solvent-based processes, which contain detectable, or a substantial amount, of processing solvents, processing solvent residues, and/or processing solvents impurities, even after the solvent-based film has undergone a drying process. A dry electrode film, such as a cathode electrode film or an anode electrode film, may be solvent-free. A dry electrode film that is solvent-free can be made from dry constituents, such as dry active material and dry binder (e.g., powders) that are also solvent-free as defined above. In some embodiments, the dry constituents may contain some amount of atmospheric moisture due to absorption of a trace amount of humidity from the surrounding air. In some embodiments, the solvent-free constituents and/or solvent-free electrode films contain a moisture content of, of about, of at most, or of at most about, 2000 ppm, 1500 ppm, 1000 ppm, 900 ppm, 800 ppm, 700 ppm, 600 ppm, 500 ppm, 400 ppm, 300 ppm, 200 ppm, 100 ppm, 50 ppm or 10 ppm, or any range of values therebetween.

A "wet" electrode, "wet process" electrode, or slurry electrode, is an electrode prepared by at least one step involving a slurry of active material(s), binder(s), and optionally additive(s). A wet electrode may include processing solvents, processing solvent residues, and/or processing solvent impurities.

A "PTFE-free" film describes a film absent of polytetrafluoroethylene (PTFE). A film with an "insubstantial amount of PTFE" describes a film with a low amount of PTFE wherein the amount of PTFE, if any at all, does not substantially affect the properties of the film or an electrochemical device comprising such film. For example, a film with an insubstantial amount or at most an insubstantial amount of PTFE may comprise less than 0.5 wt. % PTFE, which includes a film absent of PTFE.

A "nondestructive" process is a process in which an electrode active material, including the surface of the electrode active material, is not substantially modified during the process. Thus, the analytical characteristics and/or performance in an application, such as incorporation in an energy storage device, of the active material, are identical or nearly identical to those which have not undergone the process. For example, a coating on the active material may be undisturbed or substantially undisturbed during the process. A non-limiting example of a nondestructive process is "nondestructively mixing or blending," or jet milling at a reduced pressure, increased feed rate, decreased velocity (e.g., blender speed), and/or change in other process parameter(s) such that the shear imparted upon an active material remains below a threshold at which the analytical characteristics and/or performance of the active material would be adversely affected, when implemented into an energy storage device. One example of an effective non-destructive mixing process is through the use of a blade type mixer with a tip speed ranging from about 10 meters/min to about 40 meters/min. A "nondestructive" process can be distinguished from a high shear process which substantially modifies an electrode active material, such as the surface of an electrode active material, and substantially affects the analytical characteristics and/or the performance of the active material. For example, high shear blending or high shear jet milling can have detrimental effects on the surface of an electrode active material. A high shear process may be implemented, at the detriment to the active material surface characteristics, to provide other benefits, such as fibrillization of binder material, or otherwise forming a binder/active material matrix to assist in forming a self-supporting electrode film. Embodiments herein may provide similar benefits, while avoiding the detrimental effects of excessive use of high shear processes. In general, the nondestructive processes herein are performed at one or more of a higher feed rate, lower velocity, and/or lower pressure, resulting in a lower shear process than the more destructive processes that will otherwise substantially modify an electrode active material, and thus affect performance.

DESCRIPTION

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

As described herein, dry electrode processes have been developed to reduce the time-consuming and costly drying procedures required by the aforementioned wet processes. Dry electrode processes have also been developed that do not require the use of a polytetrafluoroethylene (PTFE) binder to hold together active electrode material, which is then calendered to form an electrode film. Embodiments described herein include alternative binder materials for an electrode film that can reduce the aforementioned degradation drawbacks and irreversible loss in capacity inherent to using PTFE alone as an electrode binder, for example, in a dry electrode process. Some embodiments provide electrode binder materials that can allow for electrochemical operations at low voltages with reduced or virtually no significant additional loss in energy. Some embodiments provide free-standing dry processed electrodes with a binder comprising an elastic polymer binder. In some embodiments, the free-standing electrode comprises a graphite active material and an elastic polymer binder, for example, such as high molecular weight polyethylene (PE), polyethylene oxide (PEO) and Poly(vinylidene fluoride) (PVDF). In some embodiments, the electrode film is PTFE-free, and therefore is absent of PTFE. In some embodiments, the electrode film may comprise an insubstantial amount of PTFE. In some embodiments, the electrode film may comprise at most an insubstantial amount of PTFE. Material properties, such as mechanical strengths, and electrochemical performances of such free-standing electrode films are investigated herein. For example, an electrode film having elastic polymer binder and comprising an insubstantial amount of PTFE may exhibit equivalent or higher tensile strength and/or ductility relative to a comparable electrode film comprising PTFE, which may facilitate the manufacture of an energy storage device. Specifically, electrode films having higher tensile strength and/or ductility may be easier to apply to a current collector or other substrate. These factors can be especially relevant when dry electrode processing techniques are used, as the electrode film may be handled as a free-standing film, defined further herein as a "self-supporting film."

One embodiment is a fabrication processes for forming an anode and/or electrode film comprising a PTFE-free binder composition. In some embodiments, the fabrication process or a portion of a fabrication process can be performed at room temperature or higher to facilitate formation of electrodes demonstrating desired electrical performances. In some embodiments, the fabrication process or a portion of a fabrication process is performed at, at about, at least, or at least about, 18° C., 20° C., 25° C., 30° C., 40° C., 60° C. or 80° C., or any range of values therebetween. In some embodiments, a fabrication process for forming an anode electrode film comprising a binder composition described herein is provided. In some embodiments, the anode electrode film fabrication process includes a jet-milling, blending, tumbling, or acoustic mixing step to facilitate formation of a reduced-defect, or nearly defect-free electrode film using a dry fabrication process. In some embodiments, the electrode film fabrication process does not include a high shear mixing step (e.g. high shear jet-milling), and dry electrode ingredients may be mixed under milder conditions, such as a nondestructive mixing process, to form a defect-free or nearly defect-free electrode film using a dry fabrication process. In some embodiments, the electrode film fabrication process may consist of, or consist essentially of, a single mixing step of the active material and elastic polymer binder before the electrode film is formed.

Other mechanical and electrical properties may also be considered when developing composite binder materials and processes used to form electrodes. For example, the ductility and/or porosity of a binder material may be selected to provide improved mechanical integrity and/or ionic conductivity for an electrode. In some embodiments, a binder material may be selected to provide a resulting electrode film having desirable electrical properties, while also demonstrating desired interaction with one or more other components of the device, such as the electrolyte, and/or providing desired effectiveness as a binder material.

In one embodiment, nondestructively processed active materials, for example undamaged and/or pristine surfaces of active material particulates, are incorporated into an electrode film mixture. Undamaged and/or pristine active materials may include materials with substantially similar particle size distributions, surface area distributions, surface chemical reactivates and/or surface chemical compositions to the materials as purchased commercially and/or prior to a process that might alter these physical characteristics of active materials. Thus, reduced surface degradation bulk active material(s) are provided. In some embodiments, non-destructive mixing may comprise blending, tumbling, or acoustic mixing. In some embodiments, nondestructive mixing may be performed by a resonant acoustic mixer.

The materials and methods provided herein can be implemented in various energy storage devices. For example, an energy storage device can be a capacitor, a lithium ion capacitor (LIC), an ultracapacitor, a battery, or a hybrid energy storage device and/or a hybrid cell, combining aspects of two or more of the foregoing. In some embodiments, the device is a battery. The energy storage device can be characterized by an operating voltage. In some embodiments, an energy storage device described herein can have an operating voltage of about 0 V to about 5 V. In further embodiments, the operating voltage can be about 2.7 V to about 4.2 V, about 3.0 to about 4.2 V, or any values therebetween.

In one embodiment, the energy storage device includes one or more electrodes. An electrode generally includes an electrode film and a current collector. The electrode film can be formed from a mixture of one or more binders and one or more active electrode material(s). It will be understood that an elastic polymer binder, and an electrode including an elastic polymer binder can be used in various embodiments with any of a number of energy storage devices and systems, such as one or more batteries, capacitors, capacitor-battery hybrids, fuel cells, or other energy storage systems or devices, and combinations thereof. In some embodiments, an electrode film mixture, and an electrode fabricating from an electrode film mixture described herein may be a component of a lithium ion capacitor, a lithium ion battery, an ultracapacitor, or a hybrid energy storage device combining aspects of two or more of the foregoing.

The energy storage device can be of any suitable configuration, for example planar, spirally wound, button shaped, or pouch. The energy storage device can also be a component of a system, for example, a power generation system, an uninterruptible power source systems (UPS), a photo voltaic power generation system, an energy recovery system for use in, for example, industrial machinery and/or transportation. An energy storage device may be used to power various electronic device and/or motor vehicles, including hybrid electric vehicles (HEV), plug-in hybrid electric vehicles (PHEV), and/or electric vehicles (EV).

In one embodiment, the energy storage device may comprise a reduced rise in equivalent series resistance over the life of the device. This can allow the device to have an increased power density over the life of the device. In some embodiments, these type of energy storage devices may have a reduced loss of capacity over the life of the device. These devices may also include improved cycling performance, including improved storage stability during cycling, and reduced capacity fade.

FIG. 1 shows a side cross-sectional schematic view of an example of an energy storage device 100 with an electrode film comprising an elastic polymer binder. The energy storage device 100 may be classified as, for example, a capacitor, a battery, a capacitor-battery hybrid, or a fuel cell. In some embodiments, device 100 is a lithium ion battery.

The device has a first electrode 102, a second electrode 104, and a separator 106 positioned between the first electrode 102 and second electrode 104. The first electrode 102 and the second electrode 104 are adjacent to respective opposing surfaces of the separator 106. The energy storage device 100 includes an electrolyte 118 to facilitate ionic communication between the electrodes 102, 104 of the energy storage device 100. For example, the electrolyte 118 may be in contact with the first electrode 102, the second electrode 104 and the separator 106. The electrolyte 118, the first electrode 102, the second electrode 104, and the separator 106 are housed within an energy storage device housing 120.

One or more of the first electrode 102, the second electrode 104, and the separator 106, or constituent thereof, may comprise porous material. The pores within the porous material can provide containment for and/or increased surface area for contact with an electrolyte 118 within the housing 120. The energy storage device housing 120 may be sealed around the first electrode 102, the second electrode 104 and the separator 106, and may be physically sealed from the surrounding environment.

In some embodiments, the first electrode 102 can be an anode (the "negative electrode") and the second electrode 104 can be the cathode (the "positive electrode"). The separator 106 can be configured to electrically insulate two electrodes adjacent to opposing sides of the separator 106, such as the first electrode 102 and the second electrode 104, while permitting ionic communication between the two adjacent electrodes. The separator 106 can comprise a suitable porous, electrically insulating material. In some embodiments, the separator 106 can comprise a polymeric material. For example, the separator 106 can comprise a cellulosic material (e.g., paper), a polyethylene (PE) material, a polypropylene (PP) material, and/or a polyethylene and polypropylene material.

Generally, the first electrode 102 and second electrode 104 each comprise a current collector and an electrode film. Electrodes 102 and 104 comprise electrode films 112 and 114, wherein first electrode film 112 is depicted as comprising an elastic polymer binder, and comprises an insubstantial amount of PTFE. Although second electrode film 114 is not depicted as comprising an elastic polymer binder and/or comprising an insubstantial amount of PTFE, it is to be understood that either or both electrode films 112 and/or 114 may comprise an elastic polymer binder and/or comprising an insubstantial amount of PTFE. Electrodes 102 and 104 each have a single electrode film 112 and 114 as shown, but other combinations with two or more electrode films for each electrode 102 and 104 are possible. Device 100 is shown with a single electrode 102 and a single electrode 104, but other combinations are possible. Electrode films 112 and 114 can each have any suitable shape, size and thickness. For example, the electrode films can each have a thickness of about 30 microns (μm) to about 250 microns, for example, about, or at least about 50 microns, about 100 microns, about 150 microns, about 200 microns, about 250 microns, about 300 microns, about 400 microns, about 500 microns, about 750 microns, about 1000 microns, about 2000 microns, or any range of values therebetween. Further electrode film thicknesses are described throughout the disclosure, for a single electrode film. The electrode films generally comprise one or more active materials, for example, anode active materials or cathode active materials. The electrode films 112 and/or 114 may be dry and/or self-supporting electrode films with a reduced thickness, increased electrode film density, high energy density, high specific energy density, areal energy density, areal capacity or specific capacity. The first electrode film 112 and/or the second electrode film 114 may also include one or more binders. The electrode films 112 and/or 114 may be prepared by a process as described herein. The electrode films 112 and/or 114 may be wet or self-supporting dry electrodes as described herein.

In some embodiments, the active material can be a carbon based material or a battery material. In some embodiments, an active material can include a lithium metal oxide, sulfur carbon composite and/or a lithium sulfide. In some embodiments, active material may include lithium nickel manganese cobalt oxide (NMC), lithium manganese oxide (LMO), lithium iron phosphate (LFP), lithium cobalt oxide (LCO), lithium titanate (LTO), lithium nickel manganese oxide (LNMO) and/or lithium nickel cobalt aluminum oxide (NCA). In some embodiments, the active material may include other material described herein. In some embodiments, active material may include one or more carbon materials. The carbon materials may be selected from, for example, graphitic material, graphite, graphene-containing materials, hard carbon, soft carbon, carbon nanotubes, porous carbon, conductive carbon, or a combination thereof. Activated carbon can be derived from a steam process or an acid/etching process. In some embodiments, the graphitic material can be a surface treated material. In some embodiments, the porous carbon can comprise activated carbon. In some embodiments, the porous carbon can comprise hierarchically structured carbon. In some embodiments, the porous carbon can include structured carbon nanotubes, structured carbon nanowires and/or structured carbon nanosheets. In some embodiments, the porous carbon can include graphene sheets. In some embodiments, the porous carbon can be a surface treated carbon. In preferred embodiments, the active material comprises, consists essentially of, or consists of graphite.

Generally, the electrode films described herein can be fabricated using a modified dry fabrication process. For example, some steps used to manufacture the components described in this application can be found in U.S. Patent Publication No. 2005/0266298 and U.S. Patent Publication No. 2006/0146479. These, and any other references to extrinsic documents herein, are hereby incorporated by reference in their entirety. As used herein, a dry fabrication process can refer to a process in which no or substantially no solvents are used in the formation of an electrode film. For example, components of the electrode film, including carbon materials and binders, may comprise dry particles. The dry particles for forming the electrode film may be combined to provide a dry particle electrode film mixture. In some embodiments, the electrode film may be formed from the dry particle electrode film mixture such that weight percentages of the components of the electrode film and weight percentages of the components of the dry particles electrode film mixture are substantially the same. In some embodiments, the electrode film formed from the dry particle electrode film mixture using the dry fabrication process may be free from, or substantially free from, any processing additives such as solvents and solvent residues resulting therefrom. In some embodiments, the resulting electrode films are self-supporting electrode films formed using the dry process from the dry particle mixture. In some embodiments, the resulting electrode films are free-standing electrode films formed using the dry process from the dry particle mixture. The electrode films may comprise an elastic polymer binder and/or comprise an insubstantial amount of PTFE, as described herein. In some embodiments, a free-standing electrode film may be formed in the absence of a current collector. In further embodiments, an electrode film may be a self-supporting electrode film. In some embodiments, the dry particle electrode film mixture is calendered through a first calendering process to form the electrode film. In some embodiments, the formed electrode film is again calendered through a second calendering process. In some embodiments, a calendering process (e.g. the first and/or the second calendering process) is performed at, or at about, 100° C., 150° C., 165° C., 185° C., 200° C., 215° C., 230° C., 250° C. or 280° C., or any range of values therebetween.

As shown in FIG. 1, the first electrode 102 and the second electrode 104 include a first current collector 108 in contact with first electrode film 112, and a second current collector 110 in contact with the second electrode film 114, respectively. The first current collector 108 and the second current collector 110 facilitate electrical coupling between each corresponding electrode film and an external electrical circuit (not shown). The first current collector 108 and/or the second current collector 110 comprise one or more electrically conductive materials, and can have any suitable shape and size selected to facilitate transfer of electrical charge between the corresponding electrode and an external circuit. For example, a current collector can include a metallic material, such as a material comprising aluminum, nickel, copper, rhenium, niobium, tantalum, and noble metals such as silver, gold, platinum, palladium, rhodium, osmium, iridium and alloys and combinations of the foregoing. For example, the first current collector 108 and/or the second current collector 110 can comprise, for example, an aluminum foil or a copper foil. The first current collector 108 and/or the second current collector 110 can have a rectangular or substantially rectangular shape sized to provide transfer of electrical charge between the corresponding electrode and an external circuit.

In some embodiments, the energy storage device 100 is a lithium ion battery or hybrid energy storage device including a cathode comprising an active material. In some embodiments, the lithium ion battery is configured to operate at about 2.5 to 5 V, or 2.7 to 4.2 V.

In some embodiments, an energy storage device is configured to operate at 3 volts or greater. In further embodiments, an energy storage device is configured to operate at 2.7 volts or greater. In some embodiments, an energy storage device is configured for operation at selected conditions of voltage and temperature. For example, an energy storage device can be configured for operation at 40° C., 45° C., 50° C., 55° C., 60° C., 65° C., 70° C., 75° C., 80° C., 85° C., 90° C., 95° C., 100° C., or greater temperatures, or any range of values therebetween. An energy storage device can be configured for continual operation at 2.7 V at 60 to 85° C., 2.8 V at 60 to 85° C., 2.9 V at 60 to 85° C., or 3 V at 60 to 85° C., or any selected temperature and voltage values therebetween. In some embodiments, the conditions of voltage and temperature are about 2.7 V and about 85° C., about 2.8 V and about 80° C., about 2.9 V and about 75° C., about 3 V and about 70° C., or about 3.1 V and about 65° C.

Lithium Ion Energy Storage Device

In some embodiments, energy storage device 100 can be a lithium ion energy storage device such as a lithium ion capacitor, a lithium ion battery, or a hybrid lithium ion device. In some embodiments, an electrode film of a lithium ion energy storage device electrode can comprise one or more active materials, comprise an elastic polymer binder and/or be PTFE-free or comprise an insubstantial amount of PTFE.

In some embodiments, an electrode film of a lithium ion energy storage device can comprise an anode active material. Anode active materials can comprise, for example, an insertion material (such as carbon, graphite, and/or graphene), an alloying/dealloying material (such as silicon, silicon oxide, tin, and/or tin oxide), a metal alloy or compound (such as Si—Al, and/or Si—Sn), and/or a conversion material (such as manganese oxide, molybdenum oxide, nickel oxide, and/or copper oxide). The anode active materials can be used alone or mixed together to form multi-phase materials (such as Si—C, Sn—C, SiOx-C, SnOx-C, Si—Sn, Si-SiOx, Sn-SnOx, Si-SiOx-C, Sn-SnOx-C, Si—Sn—C, SiOx-SnOx-C, Si-SiOx-Sn, or Sn-SiOx-SnOx.).

In some embodiments, an electrode film of a lithium ion energy storage device can comprise active cathode material. In some embodiments, the electrode film may further comprise a binder, and optionally a porous carbon material, and optionally a conductive additive. In some embodiments, the conductive additive may comprise a conductive carbon additive, such as carbon black. In some embodiments, the porous carbon material may comprise activated carbon. In some embodiments, the cathode active material can include a lithium metal oxide and/or a lithium sulfide. In some embodiments, the cathode active material may include lithium nickel manganese cobalt oxide (NMC), lithium manganese oxide (LMO), lithium iron phosphate (LFP), lithium cobalt oxide (LCO), lithium titanate (LTO), lithium nickel manganese oxide and/or lithium nickel cobalt aluminum oxide (NCA). The cathode active material can comprise sulfur or a material including sulfur, such as lithium sulfide ($Li_2S$), or other sulfur-based materials, or a mixture thereof. In some embodiments, the cathode film comprises a sulfur or a material including sulfur active material at a concentration of at least 50 wt %. In some embodiments, the cathode film comprising a sulfur or a material including sulfur active material has an areal capacity of at least 10 mAh/cm$^2$. In some embodiments, the cathode film comprising a sulfur or a material including sulfur active material has an electrode film density of 1 g/cm$^3$. In some embodiments, the cathode film comprising a sulfur or a material including sulfur active material further comprises a binder.

In some embodiments, a cathode electrode film of a lithium ion battery or hybrid energy storage device can include about 70 weight % to about 99 weight % of the active material, including about 70 weight % to about 96 weight %, or about 70 weight % to about 88 weight %. In some embodiments, the cathode electrode film can comprise up to about 10 weight % of the porous carbon material, including up to about 5 weight %, or about 1 weight % to about 5 weight %. In some embodiments, the cathode electrode film comprises up to about 5 weight %, including about 1 weight % to about 3 weight %, of the conductive additive. In some embodiments, the cathode electrode film comprises up to about 20 weight % of the binder, for example, about 1.5 weight % to 10 weight %, about 1.5 weight % to 5 weight %, or about 1.5 weight % to 3 weight %. In some embodiments, the cathode electrode film comprises about 1.5 weight % to about 3 weight % binder.

In some embodiments, an anode electrode film may comprise an active material, a binder, and optionally a conductive additive. In some embodiments, the conductive additive may comprise a conductive carbon additive, such as carbon black. In some embodiments, the active material of the anode may comprise a graphitic carbon, synthetic graphite, natural graphite, hard carbon, soft carbon, graphene, mesoporous carbon, silicon, silicon oxides, tin, tin oxides, germanium, lithium titanate, mixtures, or composites of the aforementioned materials. In some embodiments, an anode electrode film can include about 80 weight % to about 99 weight % of the active material, including about 90 weight % to about 98 weight %, or about 94 weight % to about 97 weight %. In some embodiments, the anode electrode film comprises up to about 5 weight %, including about 1 weight % to about 3 weight %, of the conductive additive. In some embodiments, the anode electrode film comprises up to about 20 weight % of the binder, including about 1.5 weight % to 10 weight %, about 1.5 weight % to 5 weight %, or about 3 weight % to 5 weight %. In some embodiments, the anode electrode film comprises about 4 weight % binder. In some embodiments, the anode film may not include a conductive additive.

In some embodiments, the electrode film includes a weight percent of active material of, of about, of at least, or of at least about, 90 wt. %, 92 wt. %, 94 wt. %, 95 wt. %, 96 wt. %, 97 wt. %, 98 wt. % or 99 wt. %, or any range of values therebetween.

In some embodiments, the electrode film of a lithium ion energy storage device electrode comprises an electrode film mixture comprising carbon configured to reversibly intercalate lithium ions. In some embodiments, the lithium intercalating carbon is selected from a graphitic carbon, graphite, hard carbon, soft carbon and combinations thereof. For example, the electrode film of the electrode can include a binder material, one or more of graphitic carbon, graphite, graphene-containing carbon, hard carbon and soft carbon, and an electrical conductivity promoting material. In some embodiments, an electrode is mixed with lithium metal and/or lithium ions.

In further embodiments, the energy storage device 100 is charged with a suitable lithium-containing electrolyte. For example, device 100 can include a lithium salt, and a solvent, such as a non-aqueous or organic solvent. Generally, the lithium salt includes an anion that is redox stable. In some embodiments, the anion can be monovalent. In some embodiments, a lithium salt can be selected from hexafluorophosphate ($LiPF_6$), lithium tetrafluoroborate ($LiBF_4$), lithium perchlorate ($LiClO_4$), lithium bis(trifluoromethansulfonyl)imide ($LiN(SO_2CF_3)_2$), lithium trifluoromethansulfonate ($LiSO_3CF_3$), lithium bis(oxalato)borate ($LiB(C_2O_4)_2$), lithium bis(fluorosulfonyl)imide ($LiN(SO_2F)_2$), lithium difluoro(oxalato)borate ($LiC_2BF_2O_4$) and combinations thereof. In some embodiments, the electrolyte can include a quaternary ammonium cation and an anion selected from the group consisting of hexafluorophosphate, tetrafluoroborate and iodide. In some embodiments, the salt concentration can be about 0.1 mol/L (M) to about 5 M, about 0.2 M to about 3 M, or about 0.3 M to about 2 M. In further embodiments, the salt concentration of the electrolyte can be about 0.7 M to about 1 M. In certain embodiments, the salt concentration of the electrolyte can be about 0.2 M, about 0.3 M, about 0.4 M, about 0.5 M, about 0.6 M, about 0.7 M, about 0.8 M. about 0.9 M, about 1 M, about 1.1 M, about 1.2 M, or values therebetween.

In some embodiments, an energy storage device can include a liquid solvent. The solvent need not dissolve every component, and need not completely dissolve any component, of the electrolyte. In further embodiments, the solvent can be an organic solvent. In some embodiments, a solvent can include one or more functional groups selected from carbonates, ethers and/or esters. In some embodiments, the solvent can comprise a carbonate. In further embodiments, the carbonate can be selected from cyclic carbonates such as, for example, ethylene carbonate (EC), propylene carbonate (PC), vinyl ethylene carbonate (VEC), vinylene carbonate (VC), fluoroethylene carbonate (FEC), and combinations thereof, or acyclic carbonates such as, for example, dimethyl carbonate (DMC), diethyl carbonate (DEC), ethyl methyl carbonate (EMC), and combinations thereof. In certain embodiments, the electrolyte can comprise LiPF$_6$, and one or more carbonates.

In some embodiments, the active material includes a treated carbon material, where the treated carbon material includes a reduction in a number of hydrogen-containing functional groups, nitrogen-containing functional groups and/or oxygen-containing functional groups, as described in U.S. Patent Publication No. 2014/0098464. For example, the treated carbon particles can include a reduction in a number of one or more functional groups on one or more surfaces of the treated carbon, for example about 10% to about 60% reduction in one or more functional groups compared to an untreated carbon surface, including about 20% to about 50%. The treated carbon can include a reduced number of hydrogen-containing functional groups, nitrogen-containing functional groups, and/or oxygen-containing functional groups. In some embodiments, the treated carbon material comprises functional groups less than about 1% of which contain hydrogen, including less than about 0.5%. In some embodiments, the treated carbon material comprises functional groups less than about 0.5% of which contains nitrogen, including less than about 0.1%. In some embodiments, the treated carbon material comprises functional groups less than about 5% of which contains oxygen, including less than about 3%. In further embodiments, the treated carbon material comprises about 30% fewer hydrogen-containing functional groups than an untreated carbon material.

Elastic Polymer Binder

An electrode, such as an anode and/or a cathode, having one or more electrode films comprising an elastic polymer binder material is disclosed. In some embodiments, the electrode film is PTFE-free. In some embodiments, the electrode film comprises an insubstantial amount of PTFE. In some embodiments, the elastic polymer binder may comprise one or more polyolefins and/or co-polymers thereof. In some embodiments, the elastic polymer binder may comprise one or more of a cellulose, a polyolefin, a polyether, a precursor of polyether, a polysiloxane, co-polymers thereof, and/or admixtures thereof. In some embodiments, the one or more polyolefins can include polyethylene (PE), polypropylene (PP), polyvinylidene fluoride (PVDF), co-polymers thereof, and/or mixtures thereof. In some embodiments, the elastic polymer binder may comprise branched polyethers, polyvinylethers, co-polymers thereof, and/or the like. The elastic polymer binder may comprise co-polymers of polysiloxanes and polysiloxane, and/or co-polymers of polyether precursors. For example, the elastic polymer binder may comprise poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, co-polymers thereof, and/or admixtures thereof. In some embodiments, the one or more polyolefins can include polyethylene (PE), polypropylene (PP), polyvinylidene fluoride (PVDF), co-polymers thereof, and/or mixtures thereof. The binder can include a cellulose, for example, carboxymethylcellulose (CMC). An admixture of polymers may comprise interpenetrating networks of the aforementioned polymers or co-polymers. For example, in some embodiments, the elastic polymer binder may comprise a binder selected from at least one of PE, PVDF and PEO. In some embodiments, the elastic polymer binder may consist or consist essentially of PE. In some embodiments, the elastic polymer binder may consist or consist essentially of PVDF. In some embodiments, the elastic polymer binder may consist or consist essentially of PEO. In some embodiments, the elastic polymer binder may consist or consist essentially of PE and PVDF. In some embodiments, the elastic polymer binder may consist or consist essentially of PE, PVDF and PEO.

In some embodiments, the elastic polymer binder is in particle form. In some embodiments, the elastic polymer binder particles have a $D_{50}$ average size distribution of, or of about, 2 µm, 5 µm, 10 µm, 20 µm, 30 µm, 40 µm, 50 µm, 60 µm or 100 µm, or any range of values therebetween.

The electrode film can comprise various amounts of the elastic polymer binder. In some embodiments, the electrode film can comprise or comprise about 0.5, 1, 1.5, 2, 2.5, 3, 3.5, 4, 4.5, 5, 6, 8 or 10 wt. % of the elastic polymer binder, or any range of values therebetween. In some embodiments, the electrode film can comprise or comprise about 0.5, 1, 1.5, 2, 2.5, 3, 3.5, 4, 4.5, 5, 6, 8 or 10 wt. % of PE, or any range of values therebetween. In some embodiments, the electrode film can comprise or comprise about 0.5, 1, 1.5, 2, 2.5, 3, 3.5, 4, 4.5, 5, 6, 8 or 10 wt. % of PVDF, or any range of values therebetween. In some embodiments, the electrode film can comprise or comprise about 0.5, 1, 1.5, 2, 2.5, 3, 3.5, 4, 4.5, 5, 6, 8 or 10 wt. % of PEO, or any range of values therebetween.

In some embodiments, a free-standing and/or self-supporting electrode film including an elastic polymer as described herein may have a tensile strength of at least or at least about 0.5, 1, 1.5, 2, 2.5, 3, 3.5, 4, 4.5, 5 or 6 N, or any range of values therebetween. In further embodiments, the tensile strength may be or may be about 0.5, 1, 1.5, 2, 2.5, 3, 3.5, 4, 4.5, 5 or 6 N, or a range of values therebetween.

EXAMPLES

Electrode Material

SMG-A5 graphite and LiNi$_{0.6}$Mn$_{0.2}$Co$_{0.2}$O$_2$ (NMC622) powders were used as received without drying. As such, the powders may include limited residual water due to atmospheric moisture. Elastic polymer binders include polyethylene (PE), polyethylene oxide (PEO) and polyvinylidene fluoride (PVDF) with wide ranges of molecular weights, homopolymers and copolymers. In some embodiments, particle size and distribution of the binder polymer may play a role in maintaining mechanical stability of free-standing electrode film. A polytetrafluoroethylene (PTFE) binder was also used in comparative examples. Table 1 shows the specifications for active materials and binders tested below.

TABLE 1

Active Material and Binder Specifications

| Material | Product | Manufacturer | BET | Tap density | D10 | D50 | D90 |
|---|---|---|---|---|---|---|---|
| Graphite | SMG-A5 | Hitachi Chemicals | 2.7 m$^2$/g | 0.93 g/cm$^3$ | 6.5 µm | 17.4 µm | 35.2 µm |
| Graphite | MAG-E5 | Hitachi Chemicals | 4.3 m$^2$/g | 0.96 g/cm$^3$ | 7.2 µm | 20.8 µm | 44.5 µm |
| NMC622 | HX12Th | Umicore | 1.8 m$^2$/g | 1.12 g/cm$^3$ | 11.8 µm | 20.4 µm | 34.2 µm |
| PE | PM-200 | Mitsui Chemicals | — | — | 7.8 µm | 12.8 µm | 21.6 µm |
| PVDF | KF3121-50 | Arkema | — | — | 5.5 µm | 15.5 µm | 49.3 µm |

TABLE 1-continued

| Active Material and Binder Specifications | | | | | | | |
|---|---|---|---|---|---|---|---|
| Material | Product | Manufacturer | BET | Tap density | D10 | D50 | D90 |
| PTFE | CD097E | Asahi Glass Chemicals | — | — | 74.6 μm | 317 μm | 795 μm |
| PTFE | CD123E | Asahi Glass Chemicals | — | — | 156 μm | 381 μm | 767 μm |

Dry Coated Electrode Formulations

Figure 2B:
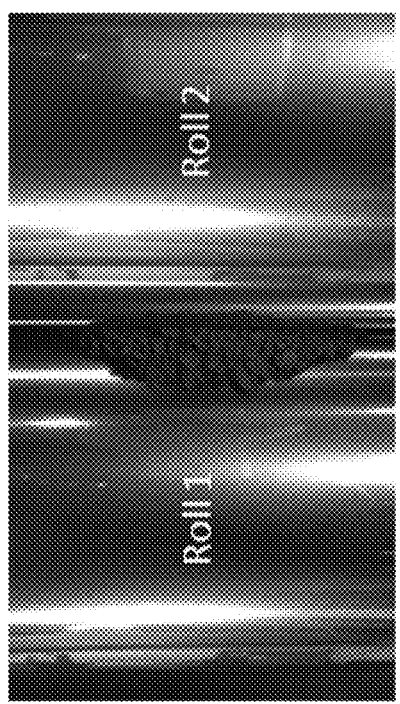
FIGS. 2A-2H show photographs of embodiments of electrode films processed from powder to a free standing film.
Figure 2D:
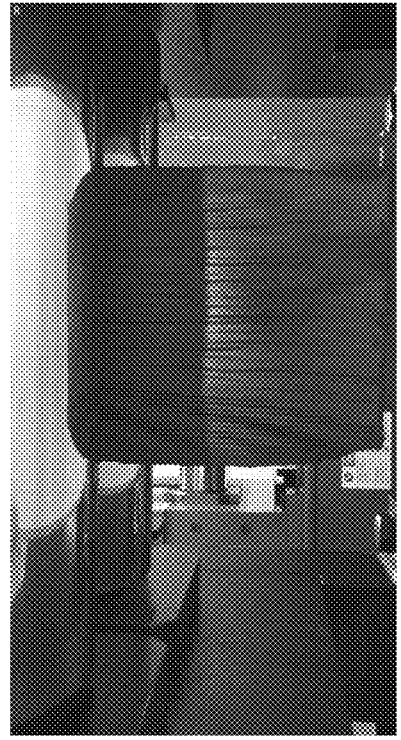
Figure 2A:
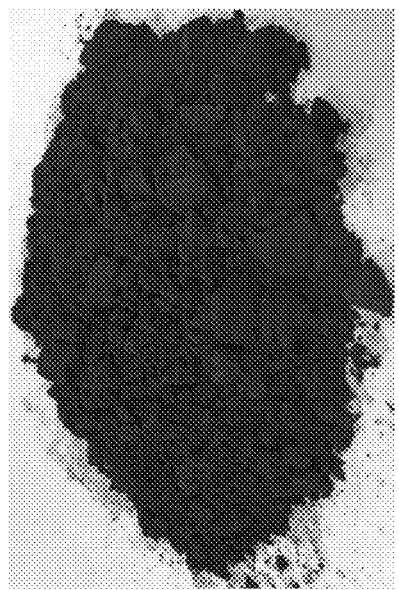
Figure 2C:
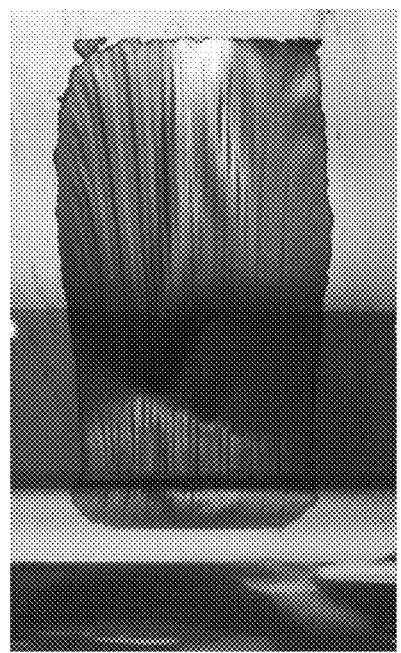
Figure 2F:
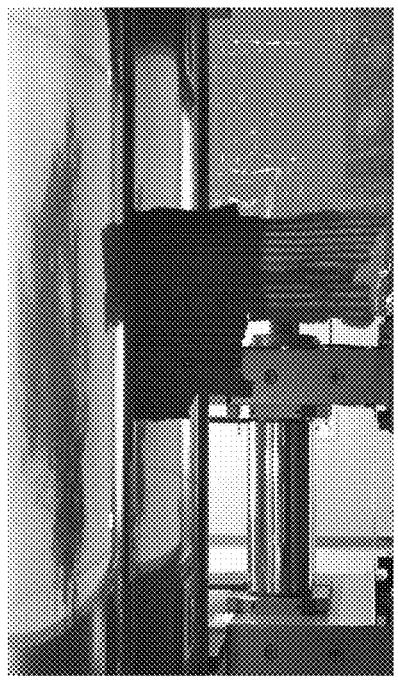
Figure 2H:
Figure 2E:
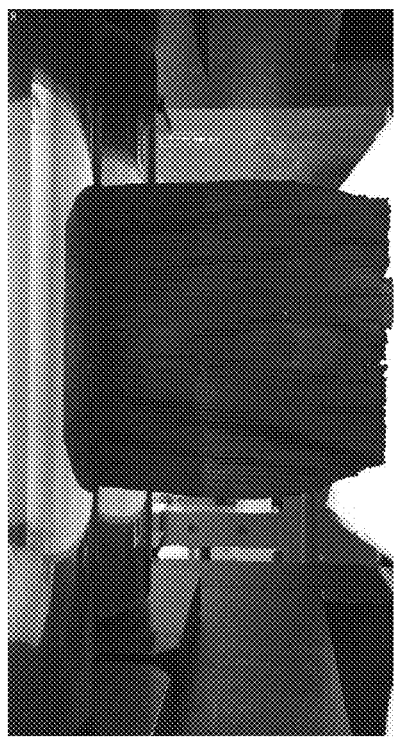
Figure 2G:

Table 2 provides electrode formulations examined comprising active material and binder. A dry powder process was carried out following the dry mixing process of: (i) Mix graphite and binder using a resonant acoustic mixer at 60% intensity for 5 min; and (ii) Grind the mixed powder using a micronizer at 40 psi pressure at feed rate of 9. The Step (ii) grinding process were excluded for PTFE-free Formulas 4-6, which were processed through only resonant acoustic mixer Step (i) without jet milling of Step (ii). Formula 3 comprises PTFE, and is provided as a comparison. FIG. 2A shows a photograph of the processed PTFE-free formulation powder, which appears to be powdery and dusty unlike processed powder formulations containing PTFE. As shown in FIG. 2B, the processed dry powders were converted into free standing electrode film under calendering process conditions shown in Table 3 to form a Film A and a Film B for each of electrode film Formulas 1-6. Film A films are converted directly from processed powder into a film, whereas Film B films are attained by recalendering a film prepared under Film A conditions until a target thickness and loading are achieved. FIGS. 2C-2F show images of PTFE-free Film A films of Formulas 1, 4, 5 and 6, respectively, as calendered directly from mixed powder, which demonstrates that free-standing graphite films without PTFE binder and jet milling process can be produced. We note that Formulas 1, 2 and 4-6 allowed for graphite electrode film that were thinner and with lower material loadings to be fabricated through only one calendering pass directly from processed formulation powder compared with typical graphite electrode film with PTFE as the sole binder.

TABLE 2

| Electrode Formula Compositions | | | | |
|---|---|---|---|---|
| Formula | Graphite | PE | PVDF | PTFE |
| 1 | 96 wt % | 4 wt % | — | — |
| 2 | 96 wt % | 3 wt % | 1 wt % | — |
| 3 | 96 wt % | — | — | 4 wt % |
| 4 | 97 wt % | 3 wt % | — | — |
| 5 | 98 wt % | 2 wt % | — | — |
| 6 | 99 wt % | 1 wt % | — | — |

TABLE 3

| Calender Processing Conditions | | | |
|---|---|---|---|
| Formula | Film A | Film B | Roll speed |
| 1 | 185° C. | 185° C. | 1.0 rpm |
| 2 | 185° C. | 185° C. | 1.0 rpm |
| 3 | 100° C. | 150° C. | 1.7 rpm |
| 4 | 185° C. | 185° C. | 1.0 rpm |
| 5 | 185° C. | 185° C. | 1.0 rpm |
| 6 | 185° C. | 185° C. | 1.0 rpm |

Mechanical Properties

Figure 3A:
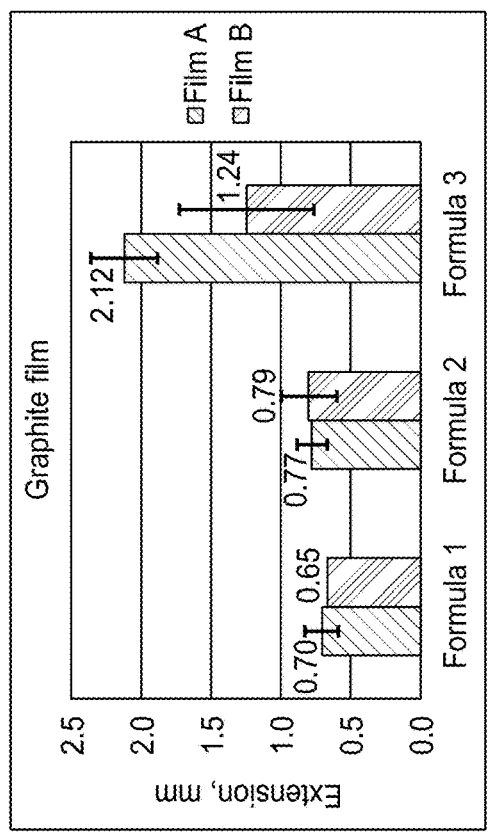
FIG. 3A provides a chart showing tensile strengths for various free standing graphite electrode film embodiments.
Figure 3B:
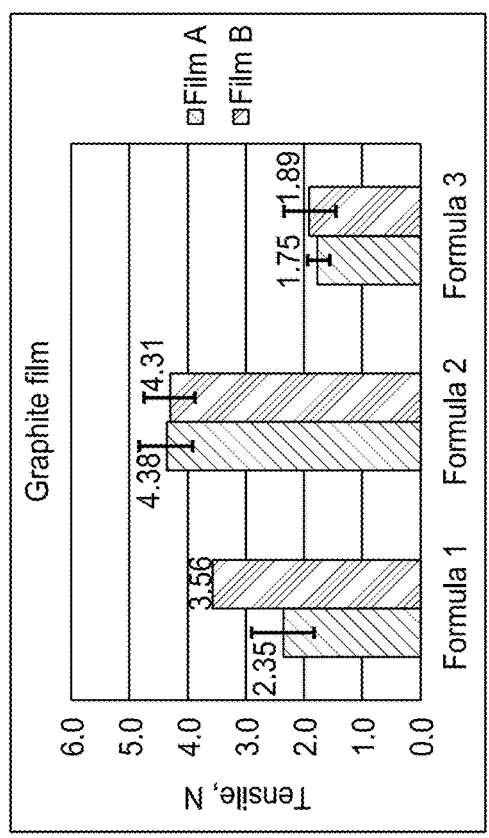
FIG. 3B provides a chart showing extensions for various free standing graphite electrode film embodiments.
Figure 4A:
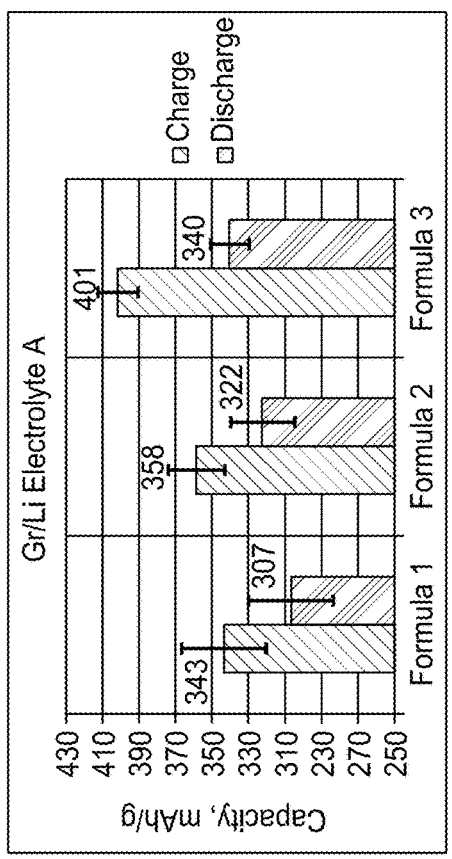
FIG. 4A provides a chart showing the charge and discharge capacities of graphite electrode half-cell embodiments with Electrolyte A.
Figure 4B:
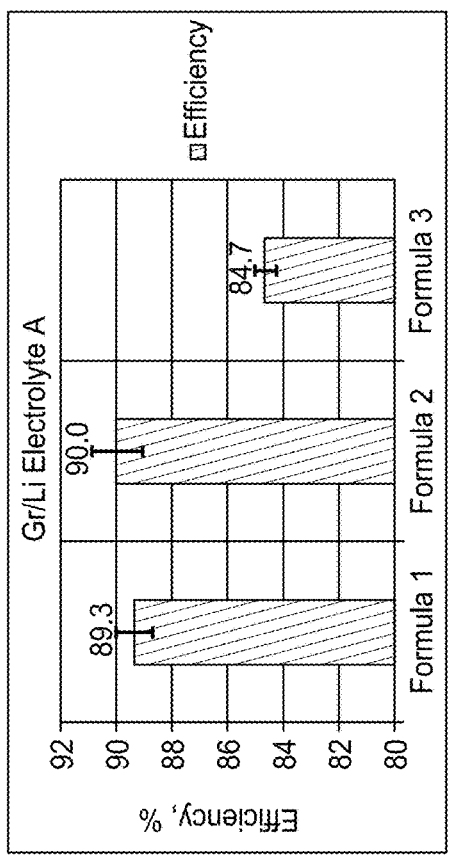
FIG. 4B provides a chart showing efficiencies of graphite electrode half-cell embodiments with Electrolyte A.
Figure 5B:
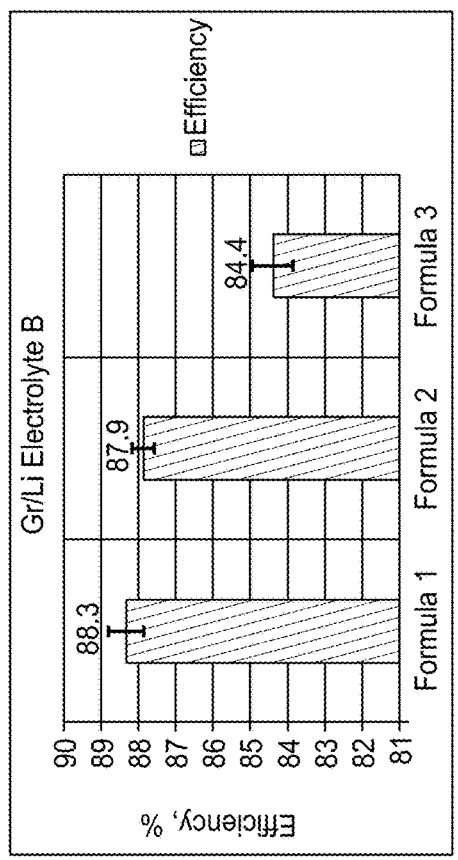
FIG. 5B provides a chart showing efficiencies of graphite electrode half-cell embodiments with Electrolyte B.
Figure 5A:
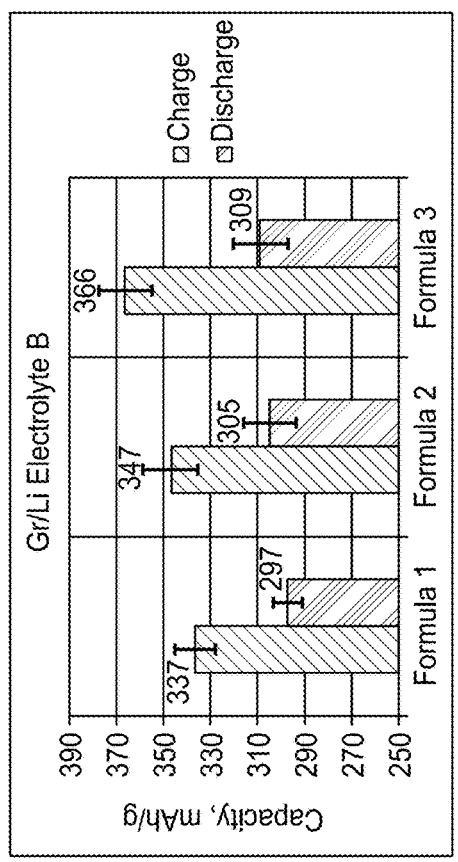
FIG. 5A provides a chart showing capacities of graphite electrode half-cell embodiments with Electrolyte B.
Figure 6A:
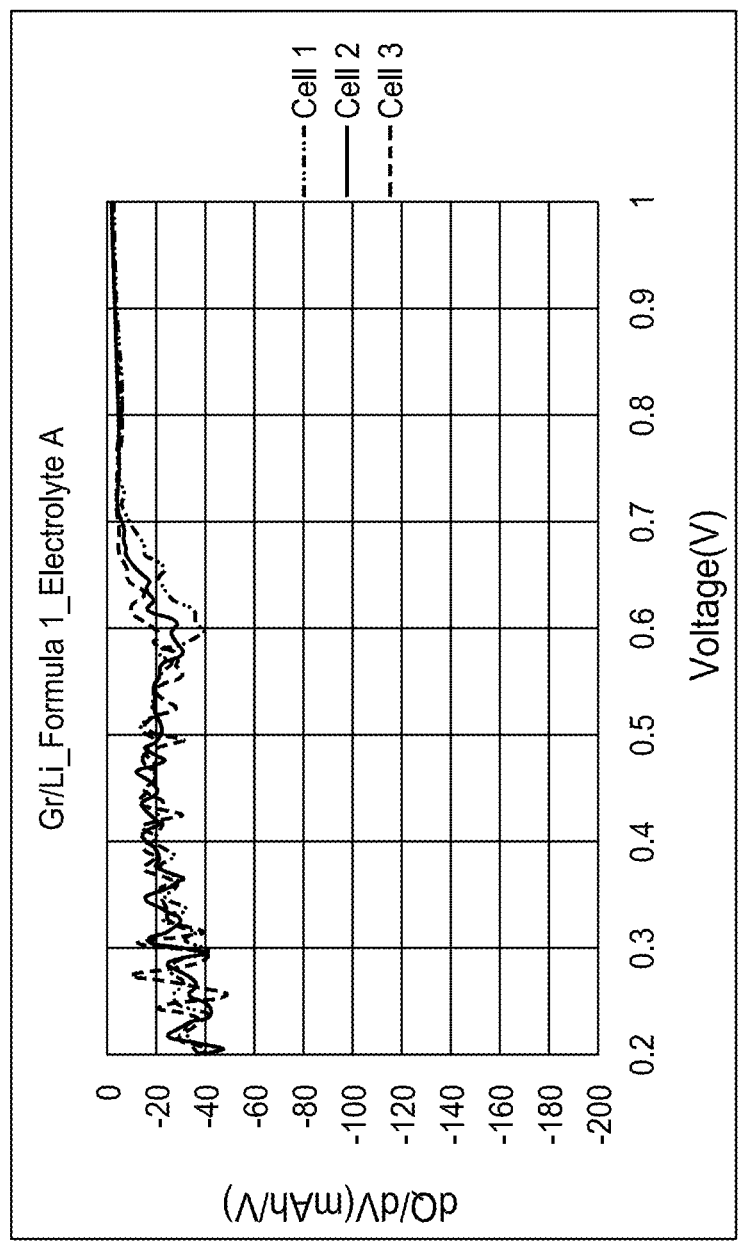
FIGS. 6A-6C provide charts showing differential capacities of graphite electrode half-cell embodiments of Formula 1 (FIG. 6A), Formula 2 (FIG. 6B) and Formula 3 (FIG. 6C) with Electrolyte A.
Figure 6B:
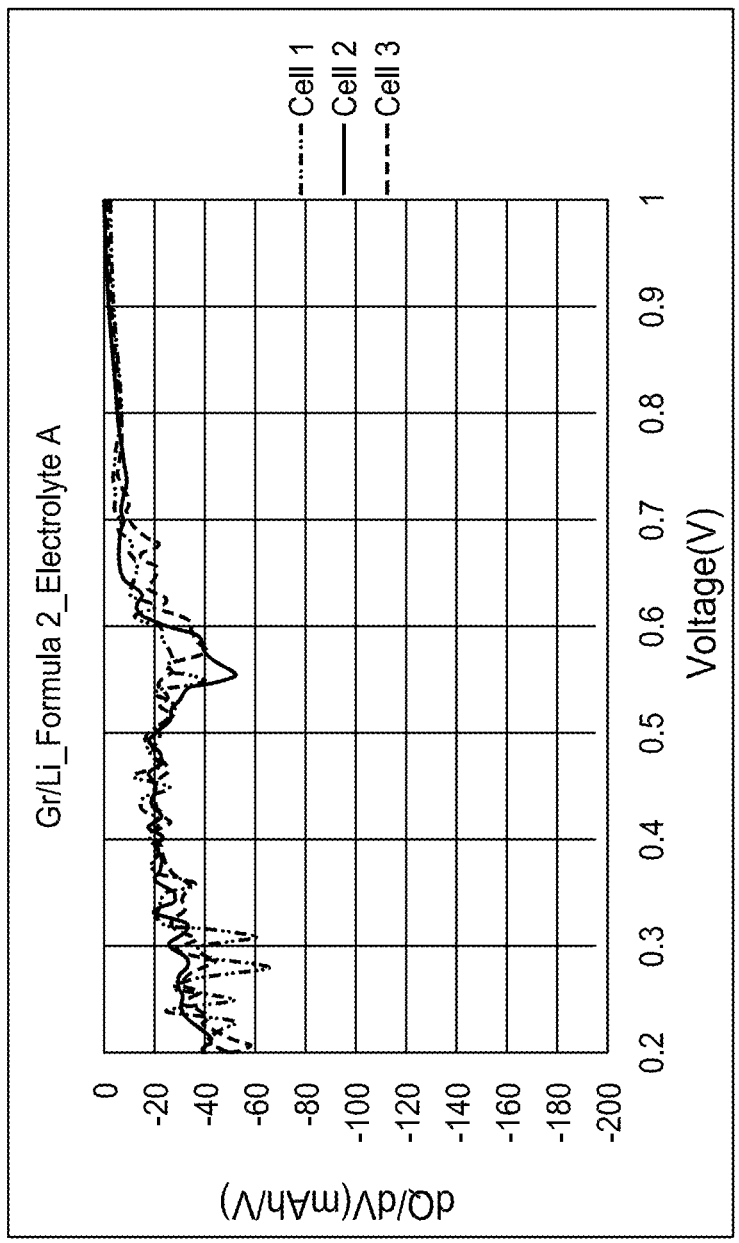
Figure 6C:
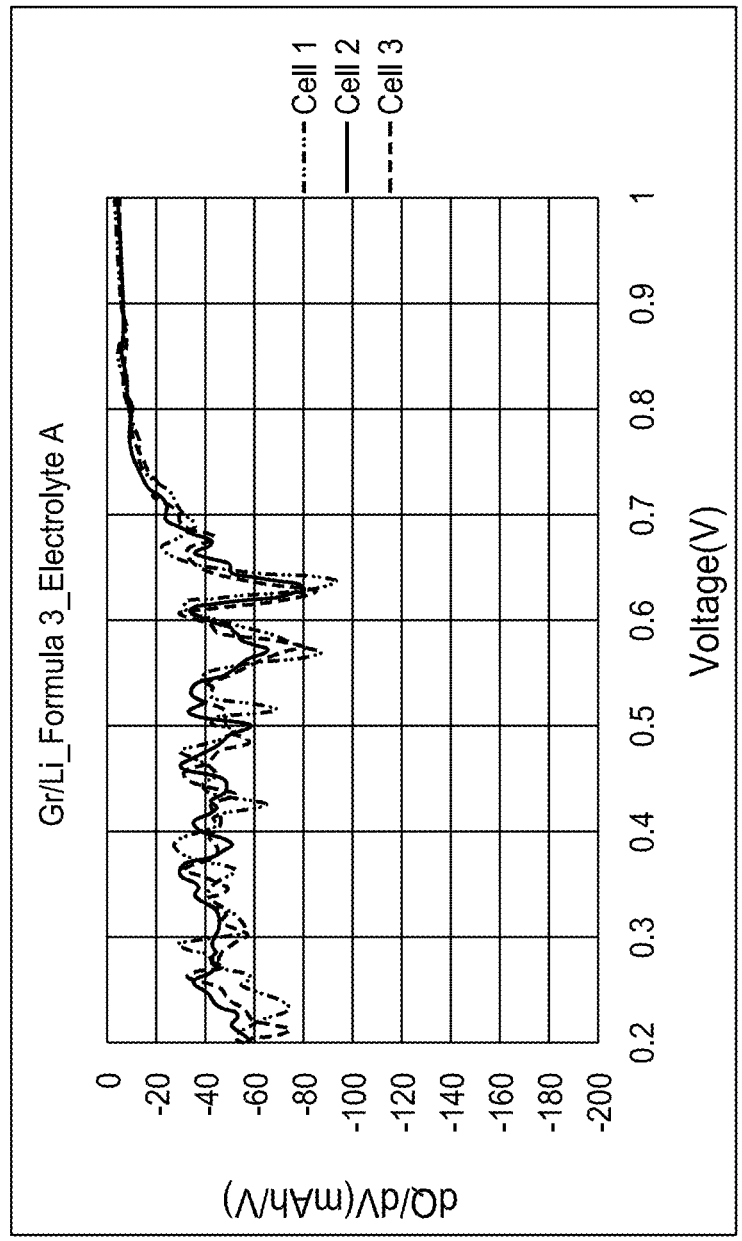
Figure 7A:
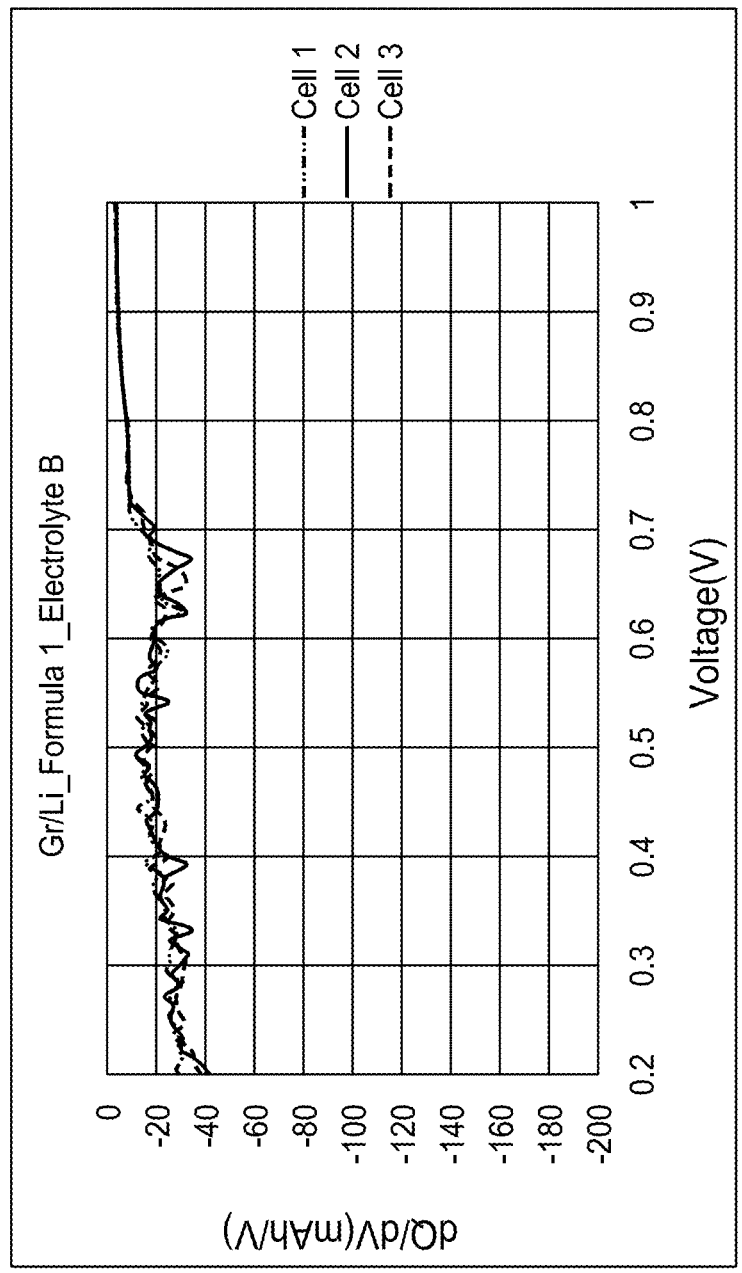
FIGS. 7A-7C provide charts showing differential capacities of graphite electrode half-cell embodiments of Formula 1 (FIG. 7A), Formula 2 (FIG. 7B) and Formula 3 (FIG. 7C) with Electrolyte B.
Figure 7B:
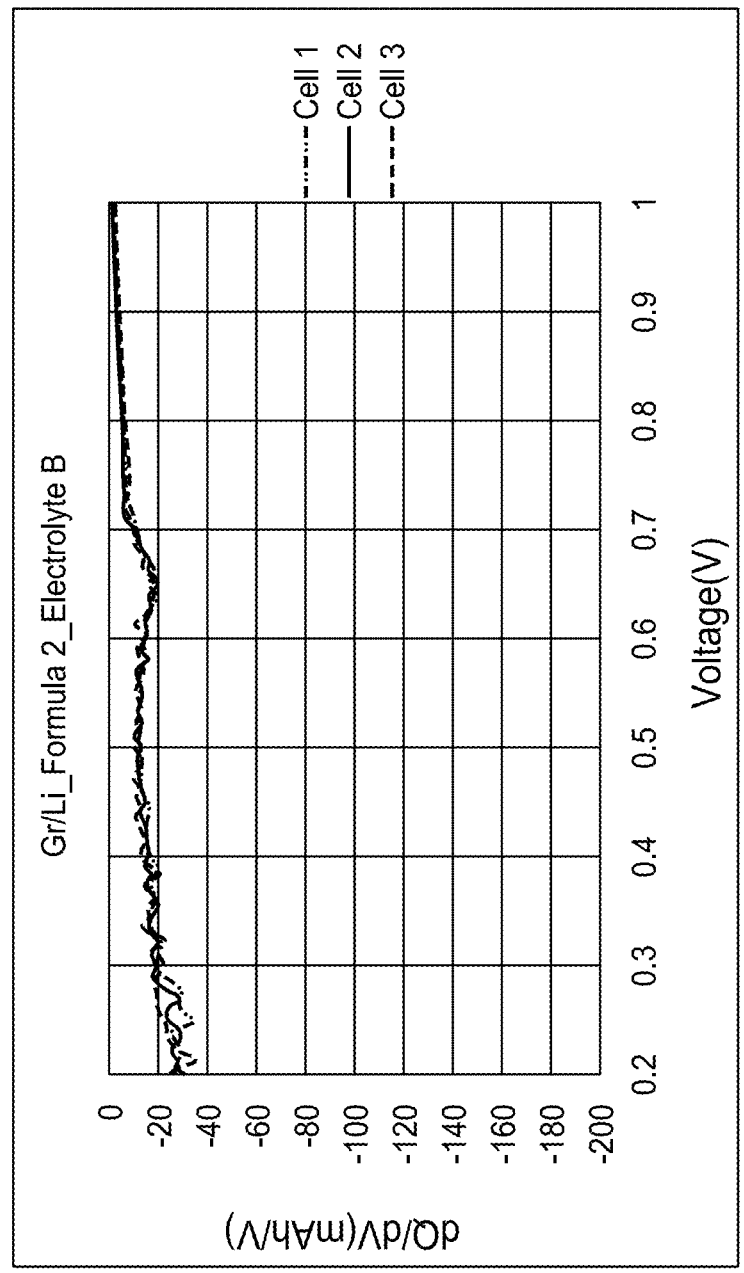
Figure 7C:
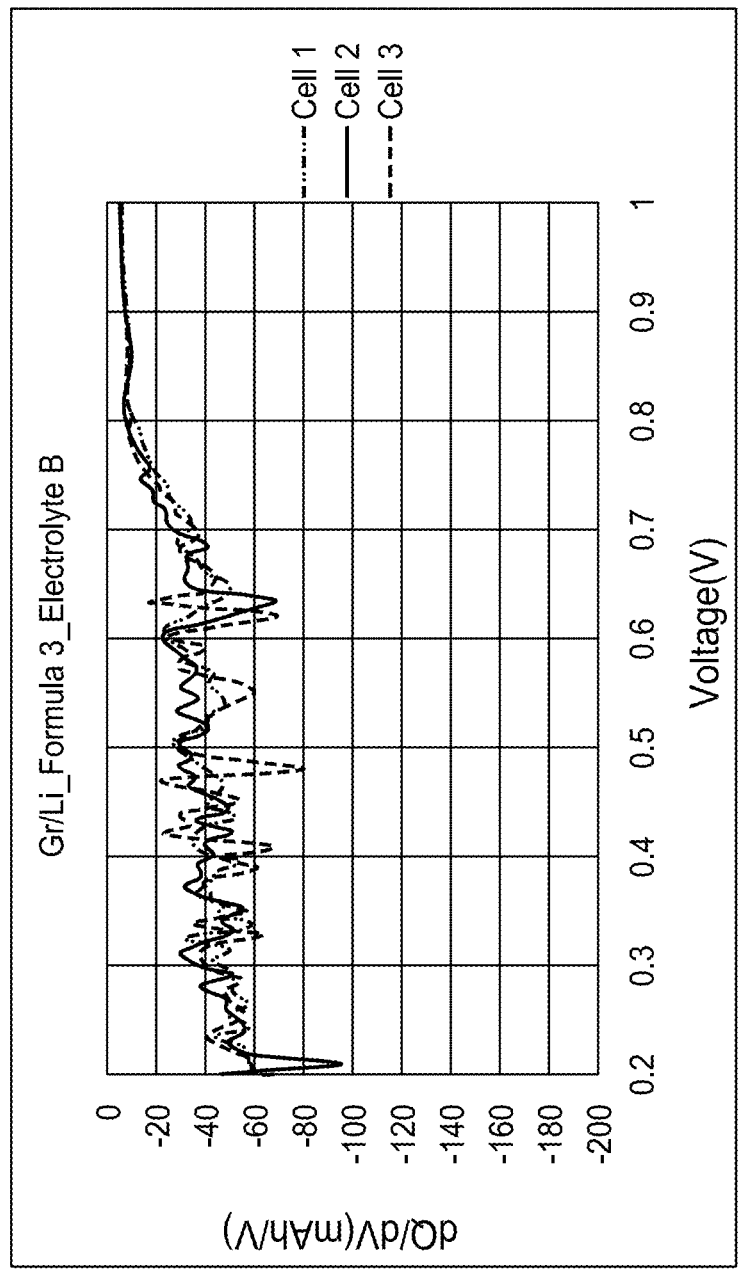
Figure 8A:
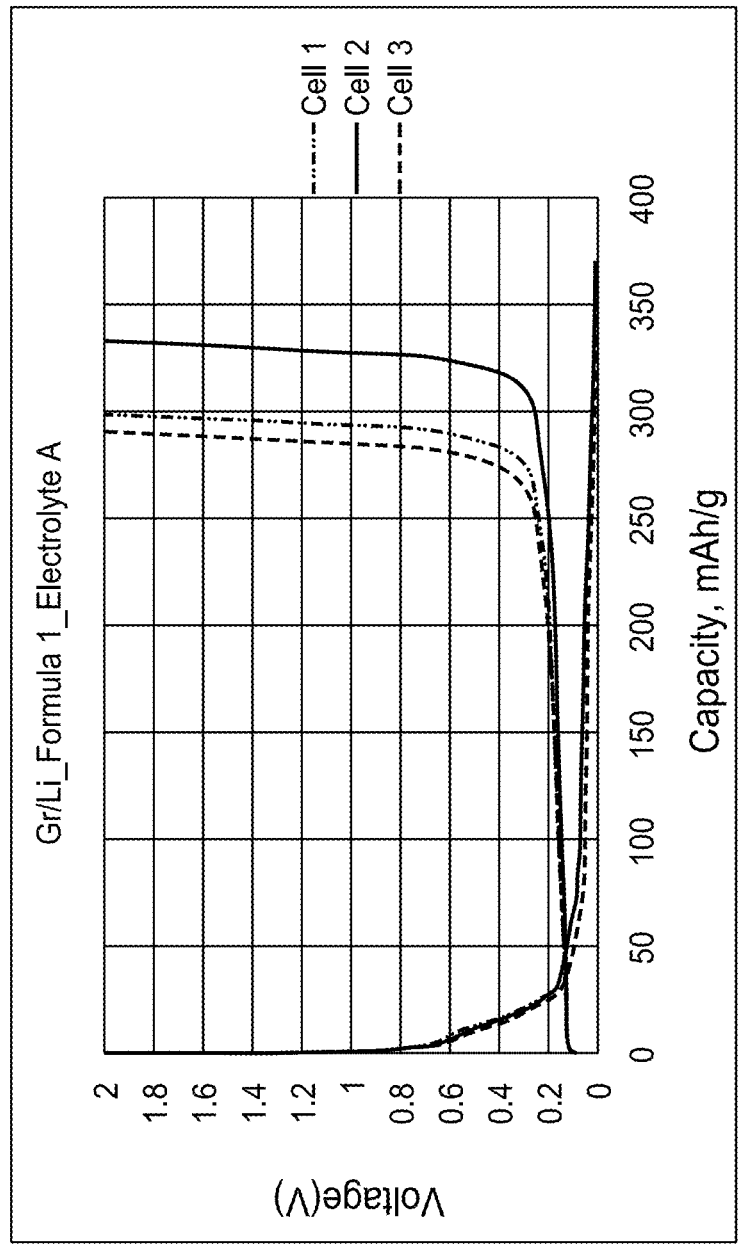
FIGS. 8A-8C provide charts showing $1^{st}$ cycle voltage profiles of graphite electrode half-cell embodiments of Formula 1 (FIG. 8A), Formula 2 (FIG. 8B) and Formula 3 (FIG. 8C) with Electrolyte A.
Figure 8B:
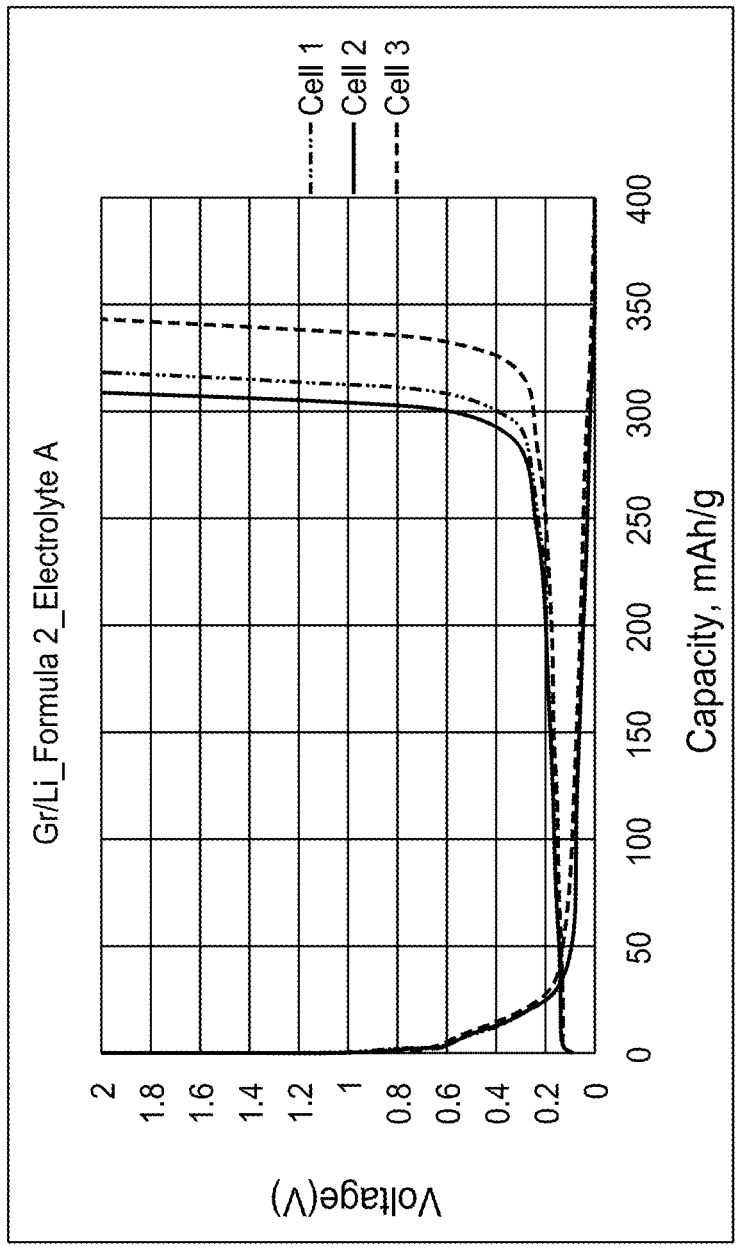
Figure 8C:
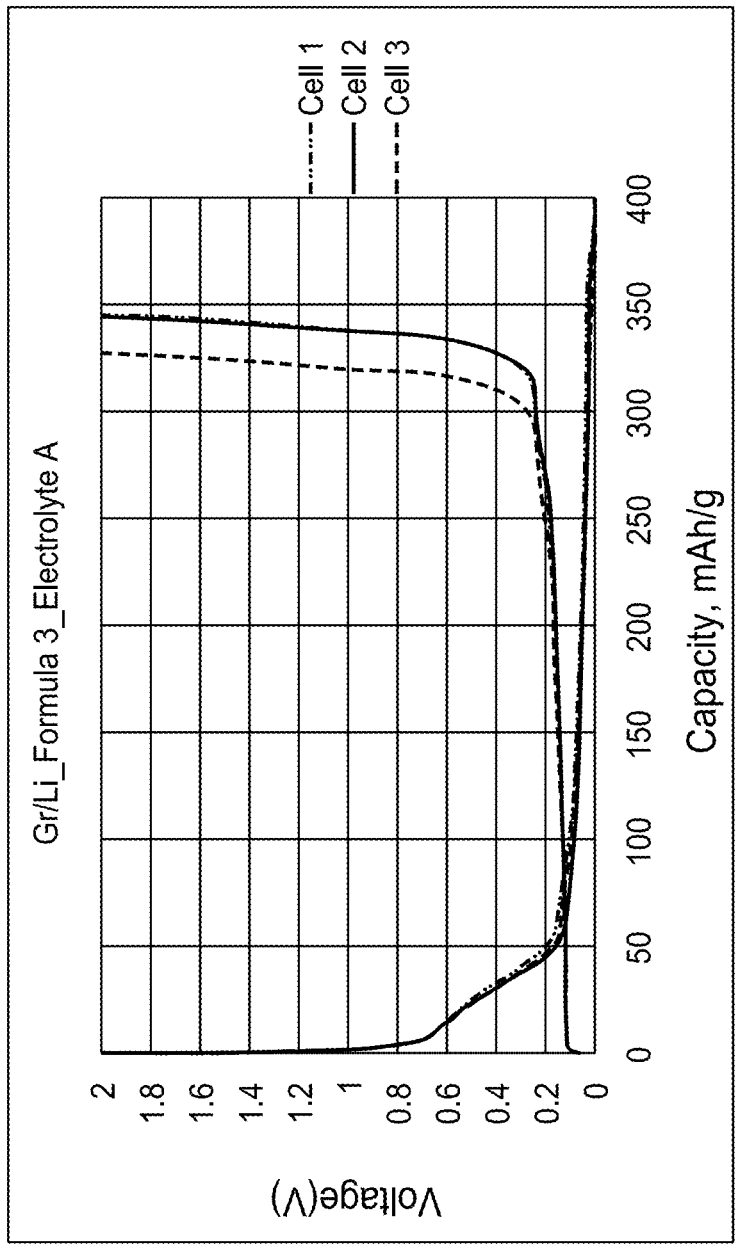

FIGS. 3A and 3B show tensile strength and extension results of free standing graphite electrode films of Formulas 1-3 calendered to Film A and Film B specifications. Unexpectedly and advantageously, the tensile strengths of Formula 1 and 2 free standing graphite electrode films without PTFE binder were found to be comparable to or exceed that of Formula 3 films with PTFE binder. Additionally, Formula 1 and 2 films substantially reduced film extension rates compared with Formula 3 graphite electrode films with PTFE binder. Furthermore, Formula 2, with the addition of PVDF to graphite electrode film with PE binder, showed substantially improved tensile strength while maintaining film extension property similar to Formula 1, with a graphite electrode film with PE binder only. We note that Formula 2 graphite electrode films, with PE and PVDF binders, results in higher film density than Formula 3 electrode films with just PTFE binder, as seen in Table 4.

TABLE 4

| Mechanical Strength Testing | | | | | | | |
|---|---|---|---|---|---|---|---|
| Formula | Film | Thickness | Loading | Density | Porosity | Tensile | Extension |
| 1 | A | 122 μm | 17.6 mg/cm$^2$ | 1.44 g/cm$^3$ | 31.3% | 2.35N | 0.70 mm |
|   | B | 109 μm | 16.6 mg/cm$^2$ | 1.52 g/cm$^3$ | 27.5% | 3.56N | 0.65 mm |
| 2 | A | 126 μm | 18.9 mg/cm$^2$ | 1.49 g/cm$^3$ | 28.8% | 4.38N | 0.77 mm |
|   | B | 77 μm | 12.2 mg/cm$^2$ | 1.58 g/cm$^3$ | 24.7% | 4.31N | 0.79 mm |
| 3 | A | 293 μm | 38.2 mg/cm$^2$ | 1.30 g/cm$^3$ | 38.1% | 1.75N | 2.12 mm |
|   | B | 146 μm | 21.7 mg/cm$^2$ | 1.49 g/cm$^3$ | 29.2% | 1.89N | 1.24 mm |

Electrochemical Cell Testing

Free-standing electrode of Film A and Film B comprising Formulations 1-3 were laminated on copper foil through a calendering process at 185° C. and dried at 110° C. under vacuum overnight before assembly against a lithium metal electrode in a pouch case with electrolyte for electrochemical evaluation. Table 5 provides coating weights for graphite electrodes used for battery cell evaluation. Table 6 provides electrolyte compositions for battery cells comprising Films A and B processed electrode films.

TABLE 5

| | Coating Loadings | | |
|---|---|---|---|
| Electrolyte | Formula 1 | Formula 2 | Formula 3 |
| A | 17.4 mg/cm$^2$ | 19.5 mg/cm$^2$ | 20.3 mg/cm$^2$ |
| B | 17.3 mg/cm$^2$ | 11.3 mg/cm$^2$ | 20.6 mg/cm$^2$ |

TABLE 6

| | Electrolyte Compositions | | | | | |
|---|---|---|---|---|---|---|
| Electrolyte | EC | EMC | DMC | PC | VC | LiPF$_6$ |
| A | 31.24 wt % | 53.92 wt % | — | — | — | 14.84 wt % |
| B | 25.89 wt % | 38.29 wt % | 16.17 wt % | 4.56 wt % | 1 wt % | 14.09 wt % |

FIGS. 4A-5B show 1$^{st}$ cycle capacity and efficiency results for dry graphite electrode half-cells with Electrolyte A and Electrolyte B measured at 0.05C rate. Regardless of electrolyte composition, PTFE-free graphite electrodes of Formulas 1 and 2 delivered substantially lower charge and discharge capacity compared to Formula 3, in part due to a higher electrode density. In addition, PTFE-free graphite electrode of Formulas 1 and 2 demonstrated reasonable capacity along with significantly higher 1$^{st}$ cycle efficiency. Furthermore, it was observed that Electrolyte B with 1 wt. % VC suppresses both charge and discharge capacities while maintaining 1$^{st}$ cycle efficiency. Similar results were found when utilizing Electrolyte A.

FIGS. 6A-7C show expanded differential capacity profiles of lithiation processes for dry graphite electrode half-cells of Formulas 1-3 with Electrolyte A and Electrolyte B, which exhibit irreversible SEI formation behavior during the initial charge process that correlates with 1$^{st}$ cycle efficiency. These results indicate that electrochemical reduction of PTFE occurred at about 0.6V, which is believed to be responsible for lower 1$^{st}$ cycle efficiencies for graphite electrodes with PTFE binder. In addition, the Formula 3 graphite electrodes with PTFE binder exhibited additional peaks at voltage between 0.2V-0.6V.

FIGS. 8A-9C show 1$^{st}$ cycle voltage profiles of dry graphite electrode half-cells with of Formulas 1-3 with Electrolyte A and Electrolyte B tested at 0.05C rate. The Formula 2 and 3 dry graphite electrodes with PE and/or PVDF binder showed a shallower knee between 0-50 mAh/g during lithiation. A similar profile during delithation was found when compared to Formula 3 graphite electrodes with PTFE binder for both Electrolyte A and Electrolyte B.

Figure 9A:
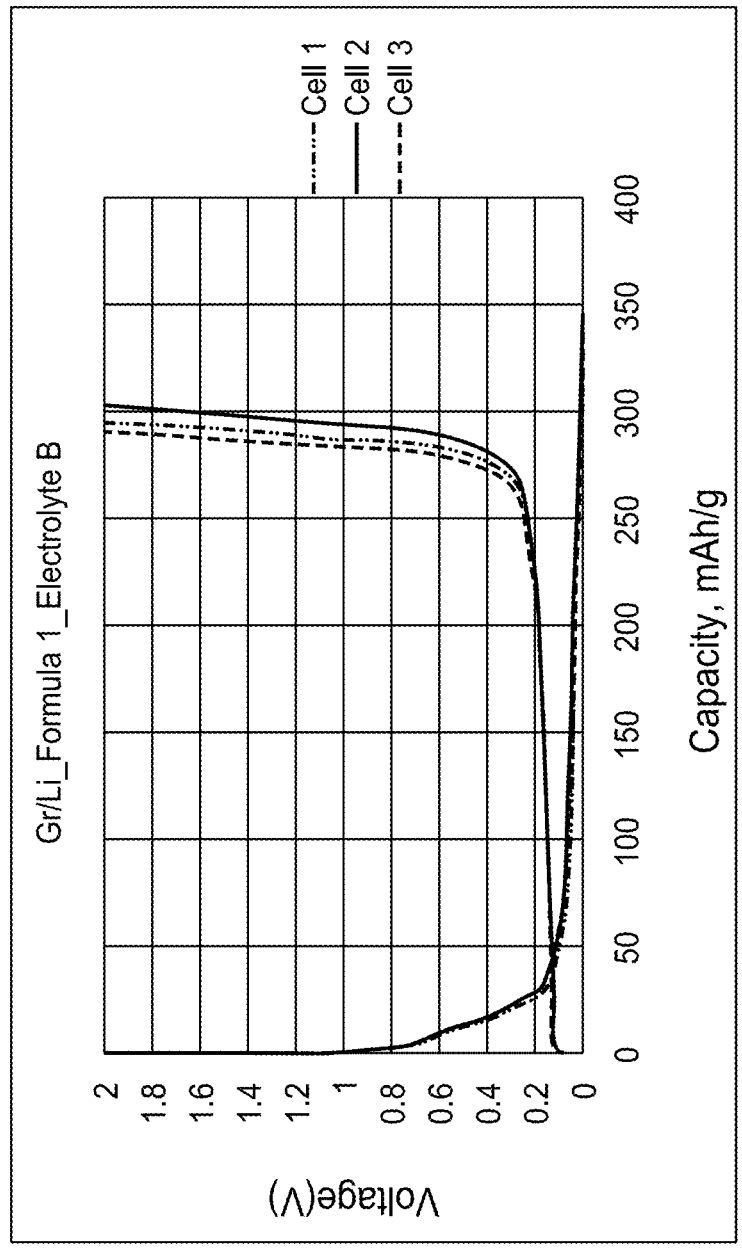
FIGS. 9A-9C provide charts showing $1^{st}$ cycle voltage profiles of graphite electrode half-cell embodiments of Formula 1 (FIG. 9A), Formula 2 (FIG. 9B) and Formula 3 (FIG. 9C) with Electrolyte B.
Figure 9B:
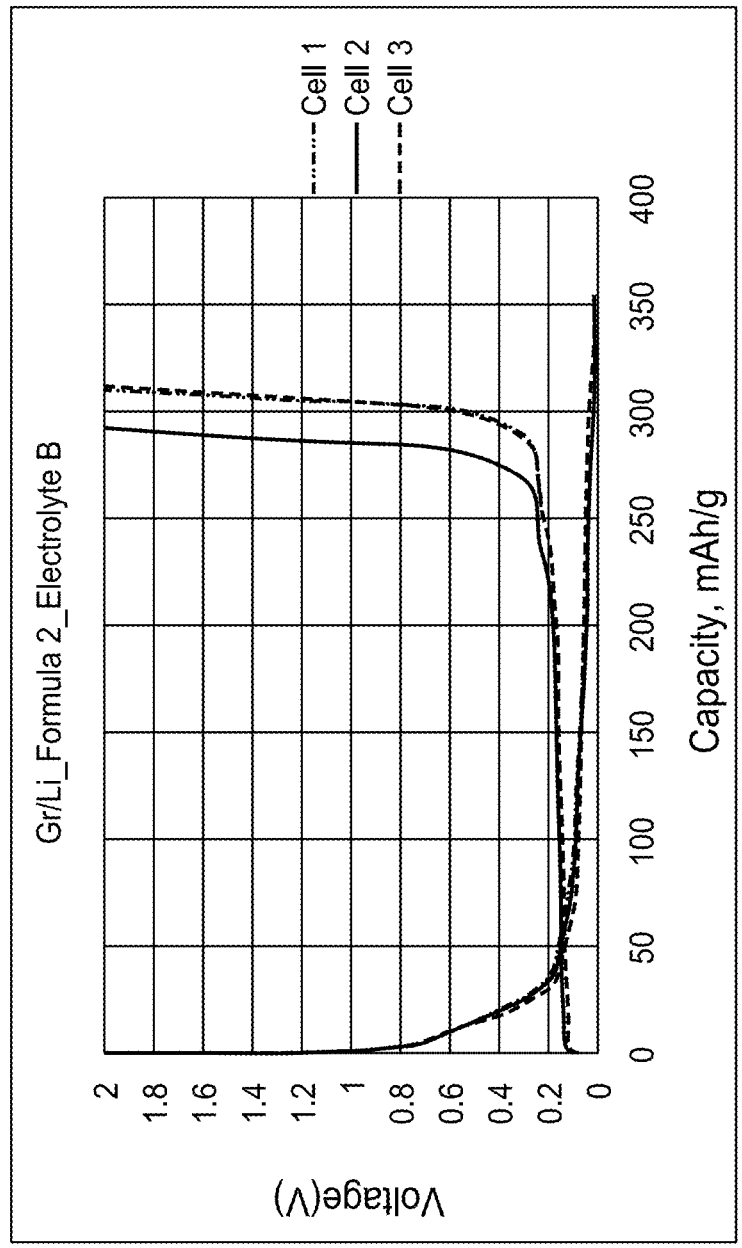
Figure 9C:
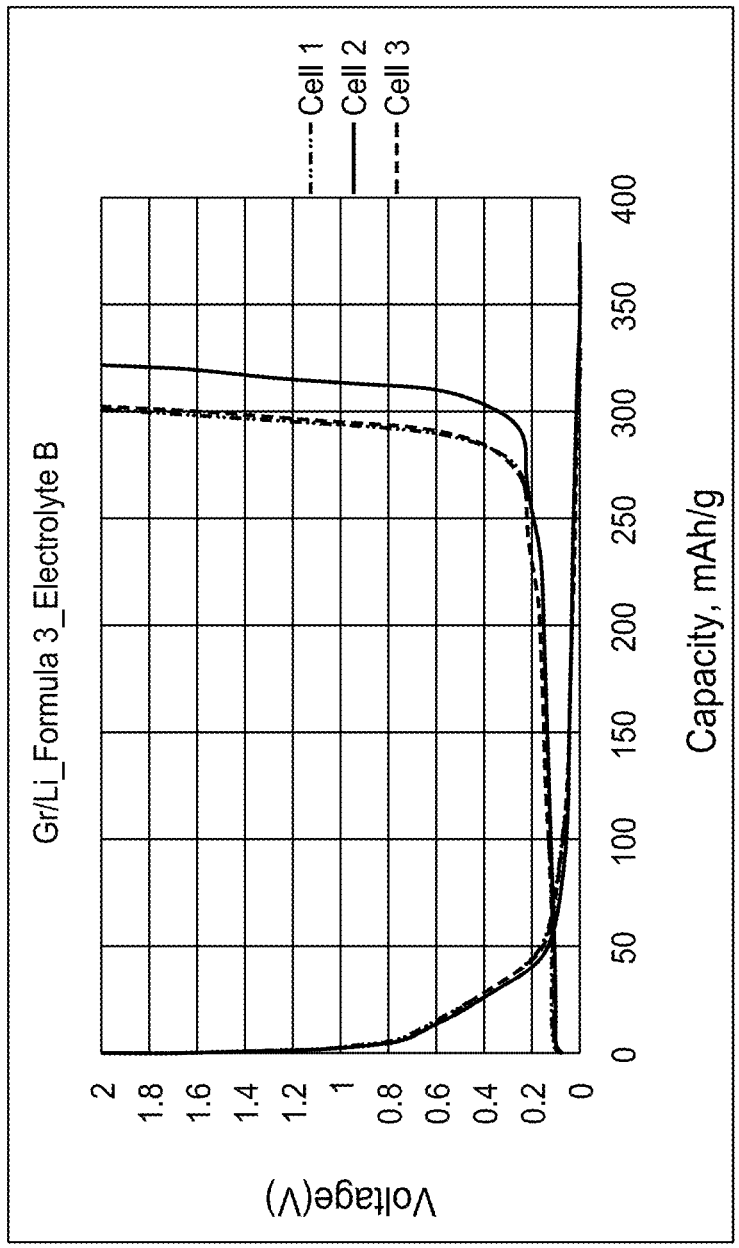
Figure 10A:
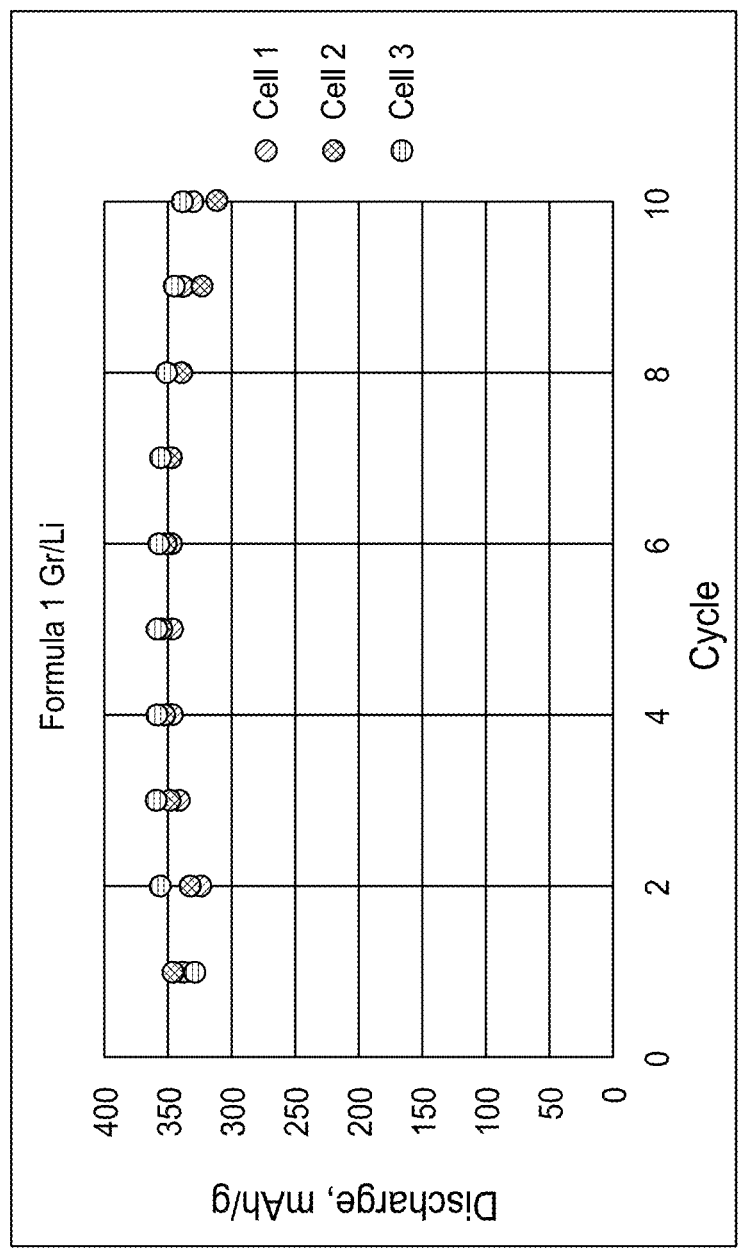
FIGS. 10A-10C provide charts showing $1^{st}$ formations followed by continuous cycle at a 0.1C rate of graphite electrode half-cell embodiments of Formula 1 (FIG. 10A), Formula 2 (FIG. 10B) and Formula 3 (FIG. 10C) with Electrolyte B.
Figure 10B:
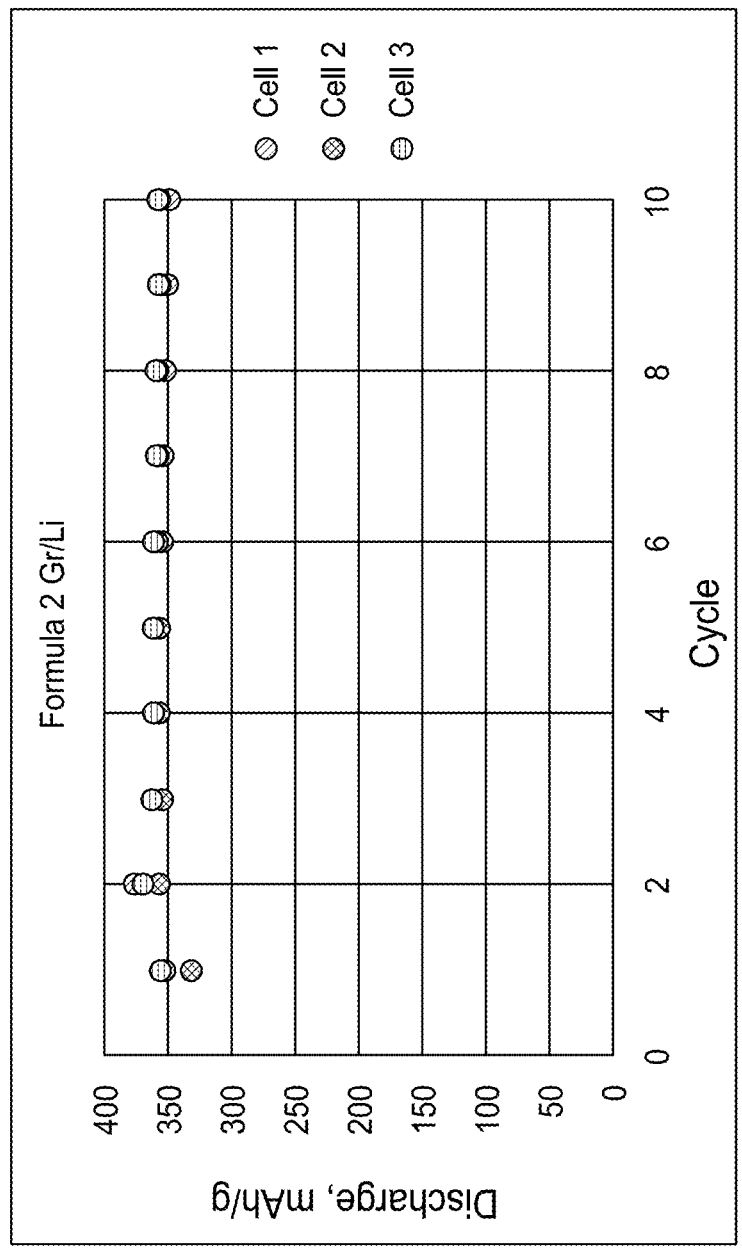
Figure 10C:
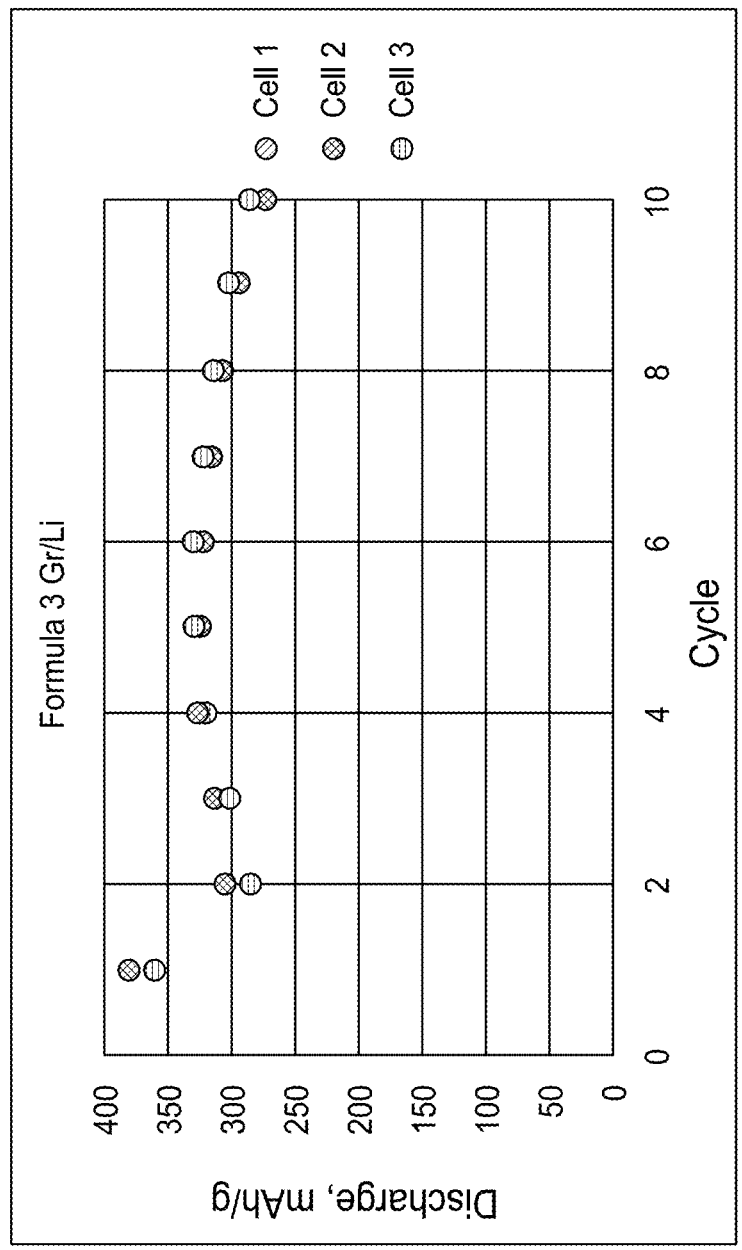

FIGS. 9A-9C shows initial cycling performance of Formulas 1-3 dry graphite electrode half-cells with Electrolyte B tested at 0.1C rate. Formula 1 and 2 PTFE-free graphite electrode cells exhibited more stable initial cycling behavior compared with Formula 3 graphite electrode cells, which reflect the influence and electrochemical instability of the PTFE binder developing a high passivation interface between the graphite electrode and the lithium metal electrode. The Formula 2 graphite electrode cell exhibited consistently stable and high capacity without capacity decline at 0.1C rate, whereas the Formula 3 graphite electrode cell showed a relatively large capacity drop at 0.1C rate followed by gradual gain of capacity. This indicates that the Formula 3 electrode cell with PTFE binder suffers from high interfacial impedance induced by polarization overpotential.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount, depending on the desired function or desired result.

The headings contained in this document, if any, are for convenience only and do not necessarily affect the scope or meaning of the devices and methods disclosed herein.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A dry electrode film for use in an energy storage device comprising:
   a dry active material comprising dry particles; and
   a dry binder comprising an elastic polymer selected from the group consisting of polyethylene, poly(ethylene oxide), polyvinylidene fluoride, and admixtures thereof, wherein the elastic polymer comprises particles having a $D_{50}$ average size distribution of about 10-100 µm;
   wherein the dry electrode film is free-standing, contains no polytetrafluoroethylene (PTFE), is absent of solvent residue, comprises at least 96 wt. % of active material, and comprises between 0.5-4 wt. % of the elastic polymer.

2. The dry electrode film of claim 1, wherein the dry electrode film comprises at least 3 wt. % of polyethylene.

3. The dry electrode film of claim 1, wherein the dry electrode film comprises at least 1 wt. % of polyvinylidene fluoride (PVDF).

4. The dry electrode film of claim 1, wherein the dry active material is graphite.

5. The dry electrode film of claim 1, wherein the dry electrode film comprises an ultimate tensile load of at least about 1 N.

6. The dry electrode film of claim 1, wherein the dry electrode film is defect-free.

7. An electrode comprising a current collector and the dry electrode film of claim 1.

8. A battery comprising the electrode of claim 7.

9. A dry electrode film fabrication process comprising:
   mixing a dry active material comprising dry particles, and a dry binder to form a dry first mixture, wherein the dry binder comprises an elastic polymer comprising particles having a $D_{50}$ average size distribution of about 10-100 µm; and
   calendering the dry first mixture to form a dry electrode film;
   wherein the dry electrode film is free-standing, contains no polytetrafluoroethylene (PTFE), and comprises at least 96 wt. % of active material, and comprises 0.5-4 wt. % of the elastic polymer;
   wherein the elastic polymer is selected from the group consisting of polyethylene, poly(ethylene oxide), polyvinyldene fluoride, and admixtures thereof, and
   wherein the dry active material has a first particle size distribution prior to mixing and a second particle size distribution subsequent to mixing, and wherein the first and second particle size distributions are substantially similar.

10. The process of claim 9, wherein mixing is performed by a nondestructive mixing process comprising resonant acoustic mixing.

11. The process of claim 9, wherein mixing does not comprise high shear mixing.

12. The process of claim 9, wherein mixing is performed at a temperature of at least about room temperature.

13. The process of claim 9, wherein calendering is performed at a temperature of about 150-250° C.

14. The process of claim 9, further comprising calendering the dry electrode film.

15. The dry electrode film of claim 1, wherein the dry electrode film comprises at least about 97 wt. % of active material.

16. The process of claim 9, wherein the dry electrode film comprises at least about 97 wt. % of active material.

17. The dry electrode film of claim 1, wherein the dry active material is a pristine dry active material.

18. The dry electrode film of claim 1, wherein the elastic polymer comprises particles have a $D_{50}$ average size distribution of about 10-50 μm.

* * * * *